(12) United States Patent
Luesing et al.

(10) Patent No.: US 11,530,292 B2
(45) Date of Patent: Dec. 20, 2022

(54) POLYURETHANE COMPRISING GRAPHENE NANO STRUCTURE

(71) Applicants: BASF SE, Ludwigshafen am Rhein (DE); Janine Luesing, Wyandotte, MI (US)

(72) Inventors: Janine Luesing, Wyandotte, MI (US); Michael Jae Lubitz, Waterford, MI (US)

(73) Assignee: BASF SE

( * ) Notice: Subject to any disclaimer, the term of this patent is extended or adjusted under 35 U.S.C. 154(b) by 0 days.

(21) Appl. No.: 16/348,243

(22) PCT Filed: Nov. 9, 2017

(86) PCT No.: PCT/US2017/060866
§ 371 (c)(1),
(2) Date: May 8, 2019

(87) PCT Pub. No.: WO2018/089638
PCT Pub. Date: May 17, 2018

(65) Prior Publication Data
US 2019/0315909 A1 Oct. 17, 2019

Related U.S. Application Data

(60) Provisional application No. 62/419,753, filed on Nov. 9, 2016.

(51) Int. Cl.
| | |
|---|---|
| *C08G 18/76* | (2006.01) |
| *C08K 3/04* | (2006.01) |
| *C08G 18/42* | (2006.01) |
| *C08G 18/48* | (2006.01) |
| *C08K 7/00* | (2006.01) |
| *C08G 18/10* | (2006.01) |
| *C08K 5/053* | (2006.01) |
| *C08K 5/17* | (2006.01) |
| *C08L 75/04* | (2006.01) |
| *C08K 5/00* | (2006.01) |
| *C08G 18/12* | (2006.01) |
| *C08G 18/18* | (2006.01) |
| *C08G 18/40* | (2006.01) |

(52) U.S. Cl.
CPC ......... *C08G 18/7671* (2013.01); *C08G 18/10* (2013.01); *C08G 18/12* (2013.01); *C08G 18/1808* (2013.01); *C08G 18/4018* (2013.01); *C08G 18/4238* (2013.01); *C08G 18/4277* (2013.01); *C08G 18/48* (2013.01); *C08G 18/4854* (2013.01); *C08G 18/4887* (2013.01); *C08K 3/042* (2017.05); *C08K 5/0025* (2013.01); *C08K 5/053* (2013.01); *C08K 5/17* (2013.01); *C08K 7/00* (2013.01); *C08L 75/04* (2013.01); *C08K 2201/005* (2013.01); *C08K 2201/011* (2013.01); *C08L 2207/04* (2013.01)

(58) Field of Classification Search
CPC ............ C08G 18/7671; C08G 18/4238; C08G 18/4277; C08G 18/4854; C08G 18/4887; C08G 18/10; C08G 18/48; C08G 18/12; C08G 18/1808; C08G 18/4018; C08K 3/042; C08K 7/00; C08K 5/053; C08K 5/17; C08K 5/0025; C08K 2201/011; C08K 2201/005; C08L 75/04; C08L 2207/04
See application file for complete search history.

(56) References Cited

U.S. PATENT DOCUMENTS

| | | | | |
|---|---|---|---|---|
| 5,667,716 | A * | 9/1997 | Ziolo ................... | H01F 1/0063 252/62.52 |
| 8,785,540 | B2 * | 7/2014 | Muller ................. | C09J 131/04 524/457 |
| 2008/0093104 | A1 * | 4/2008 | Gahleitner ............. | C08L 23/04 174/110 SR |
| 2009/0246811 | A1 * | 10/2009 | Arakawa ................. | C12Q 1/44 435/19 |
| 2010/0160545 | A1 * | 6/2010 | Page ....................... | C08L 75/04 524/589 |
| 2010/0249273 | A1 * | 9/2010 | Scales ..................... | C08L 33/04 523/210 |
| 2011/0046286 | A1 * | 2/2011 | Lubnin .................. | C08G 18/12 524/425 |
| 2014/0174991 | A1 * | 6/2014 | Khripin .................. | B01D 15/02 209/3.1 |
| 2016/0254466 | A1 * | 9/2016 | Koizumi ............. | C23C 18/2086 257/40 |
| 2017/0361376 | A1 * | 12/2017 | Murugesan ......... | C09B 67/0097 |
| 2019/0322789 | A1 * | 10/2019 | Lubitz ................ | C08G 18/4018 |

FOREIGN PATENT DOCUMENTS

EP 2868626 * 5/2015

OTHER PUBLICATIONS

Kovtun et al., "Benchmarking of Graphene-Based Materials: Real Commercial Products Versus Ideal Graphene", 2D Mater., 6, 025006, Jan. 24, 2019, pp. 1-13.*

Author Unknown, Bayer Material Science Bulletin, "Desmopan (TPU) Product Range-Reference Data", Edition Sep. 2004, (2004), pp. 1-22.*

(Continued)

*Primary Examiner* — Patrick D Niland
(74) *Attorney, Agent, or Firm* — Armstrong Teasdale LLP

(57) ABSTRACT

Described herein is a cast elastomer including graphene nano platelets and a process for preparing the same.

20 Claims, 3 Drawing Sheets

(56) References Cited

OTHER PUBLICATIONS

Dul et al., "Effect of Graphene Nanoplatelets Structure on the Properties of Acrylonitrile-Butadiene-Styrene Composites", Society of Plastics Engineers, Published online in Wiley Online Library (wileyonlinelibrary.com), 2017, pp. E285 to E300.*
Amir, et al., "Graphene nanoplatelets loaded polyurethane and phenolic resin fibres by combination of pressure and gyration", Composites Science and Technology, vol. 129, 2016, pp. 173-182.
Chen, et al., "Mechanical Reinforcement in Thermoplastic Polyurethane Nanocomposite Incorporated with Polydopamine Functionalized Graphene Nanoplatelet", Industrial & Engineering Chemistry Research, vol. 56, Issue 41, 2017, pp. 11827-11838.
Kaur, et al., "Graphene/polyurethane composites: fabrication and evaluation of electrical conductivity, mechanical properties and cell viability ", RSC Advances, vol. 5, Issue 120, 2015, pp. 98762-98772.
International Search Report for International Application No. PCT/US2017/060866, dated Feb. 14, 2018, 3 pages.
Written Opinion for International Application No. PCT/US2017/060866, dated Feb. 14, 2018, 6 pages.

* cited by examiner

POLYURETHANE COMPRISING GRAPHENE NANO STRUCTURE

CROSS-REFERENCE TO RELATED APPLICATIONS

This application is a U.S. National Phase Application of PCT/US2017/060866, filed Nov. 9, 2017, which claims the benefit of priority to U.S. Provisional Patent Application No. 62/419,753, filed Nov. 9, 2016, the entire contents of which are hereby incorporated by reference herein.

FIELD OF INVENTION

The presently claimed invention is directed to a cast elastomer comprising graphene nano platelets and a process for preparing the same.

BACKGROUND

The use of fillers to improve the physical and rheological properties of polymeric materials is known in the art. For example, the addition of conductive filler to a polymer can impart conductivity on the resulting polymeric material, which would otherwise act as an insulator. As another example, the addition of reinforcing filler to a polymer can impart improved load, creep, fatigue, strength, durability, and other properties on the resulting polymeric material.

However, the use of fillers in polymeric materials sometimes comes with disadvantages. For example, large quantities of fillers are often required to achieve the desired properties, but can make processing difficult, e.g. compounding can be difficult. As another example, the use of filler in polymeric materials can decrease the elongation of the polymeric materials. As a final example, the use of filler in polymeric materials can cause embrittlement of the polymeric materials.

Further, fillers, especially nano sized fillers, can be hard to disperse within a polymer matrix, and thus result in a polymeric material having inconsistent physical and rheological properties. As such, the use of filler in a polymeric material positively impacts certain properties of the polymeric material while negatively impacting other properties of the polymeric material. Moreover, the existing techniques are also labour intensive. Therefore, to overcome such dispersion issues, nano sized fillers such as graphene have been pre-processed via sonication, exfoliation, and intercalation, and dispersed within polymeric materials via complicated, solvent based processes with limited success.

It is desired that for applications involving increased modulus, the elasticity and durability of the elastomeric material is not compromised. Moreover, the physical and mechanical properties for these applications must be maintained over a wide range of temperature in the range of $-30°$ C. to $150°$ C., which is difficult to achieve and maintain thereafter. Accordingly, there remains an opportunity for improvement.

Thus, it was an objective of the presently claimed invention to provide a cast elastomer which has improved mechanical properties such as modulus, compression set, Bayshore resilience, stress and break at elongation with a broad shore hardness range over a wide range of temperature in the range of $-30°$ C. to $150°$ C., which renders it suitable for obtaining articles therefrom.

SUMMARY OF THE INVENTION

Surprisingly, it has been found that graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, along with at least one isocyanate component, at least one polyol component and at least one cross-linker or a chain extender provide a cast elastomer with improved mechanical properties such as modulus, compression set, Bayshore resilience, stress and break at elongation with a broad shore hardness range over a wide range of temperature in the range of $-30°$ C. to $150°$ C., thereby rendering it suitable for obtaining articles therefrom.

Accordingly, in one aspect the present invention is directed to a cast elastomer comprising the reaction product of:

(A) 10 wt.-% to 98 wt.-% of at least one isocyanate component,
(B) 2 wt.-% to 90 wt.-% of at least one polyol component,
(C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one isocyanate component in g,
$EW_{ICN}$ is the equivalent weight of the at least one isocyanate component in g/eq,
n is the number of cross linker or chain extender and the isocyanate.

In another aspect, the present invention is directed to a process for preparing the above cast elastomer, comprising the steps of:

(A') preparing an isocyanate prepolymer comprising the at least one isocyanate component (A), the at least one polyol component (B) and the graphene nano platelets (C),
wherein the isocyanate prepolymer has an isocyanate index in the range of 1 to 300, and
(B') reacting the isocyanate prepolymer of step (A') with the at least one crosslinker or the chain extender to obtain a cast elastomer having a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate, wherein the graphene nanoplatelets (C) have an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight based on the total weight of the graphene nano platelets (C).

In another aspect, the present invention is directed to an isocyanate prepolymer obtained by the above process, characterized in that the isocyanate prepolymer has NCO content in the range of 2 wt.-% to 50 wt.-%.

In a further aspect, the present invention is directed to a use of the above cast elastomer or as obtained by the above process in an article.

In yet another aspect, the present invention is directed to an article comprising the above cast elastomer or as obtained by the above process.

BRIEF DESCRIPTION OF THE FIGURES

Other advantages of the present invention will be readily appreciated, as the same becomes better understood by reference to the following detailed description when considered in connection with the accompanying figures wherein.

DETAILED DESCRIPTION OF THE INVENTION

Figure 1A:
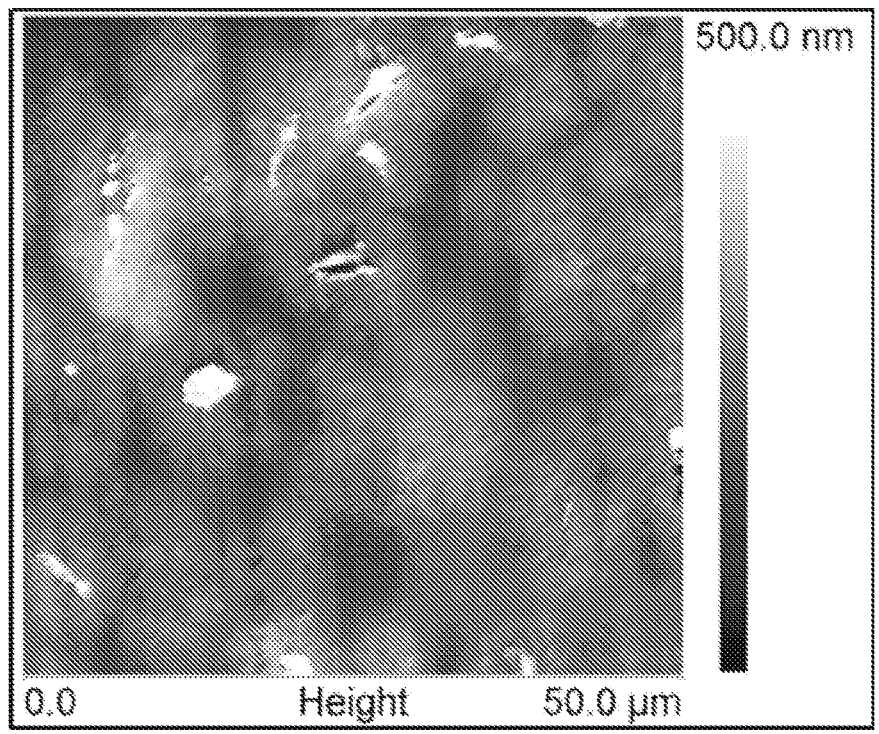
FIG. 1A is an atomic force microscope (AFM) image of a cast elastomer formed with an isocyanate prepolymer comprising graphene nano platelets.

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well i.e. a range of 1 to 10 implies that both 1 and 10 are included in the range. For the avoidance of doubt, Applicant shall be entitled to any equivalents according to applicable law.

A cast elastomer is generally formed from a two-component polyurethane system comprising an isocyanate prepolymer and a curative or chain extender. However, in order to improve the mechanical properties of the cast elastomer, it has been found in the present invention that the addition of graphene nano platelets enhances the mechanical properties such as, but not limited, modulus, compression set, Bayshore resilience, stress and break at elongation.

Accordingly, the present invention describes a cast elastomer comprising the reaction product of:
(A) 10 wt.-% to 98 wt.-% of at least one isocyanate component,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one isocyanate component in g,
$EW_{ICN}$ is the equivalent weight of the at least one isocyanate component in g/eq,
n is the number of cross linker or chain extender and the isocyanate.

The at least one isocyanate component (A) may include, but is not limited to, isocyanates, diisocyanates, polyisocyanates, biurets of isocyanates and polyisocyanates, isocyanurates of isocyanates and polyisocyanates, and combinations thereof. The at least one isocyanate (A) is any molecule or macromolecule which includes one or more isocyanate (NCO) groups. Preferably, the at least one isocyanate (A) comprises a plurality of NCO functional groups, e.g. 2, 3, 4, 5, 6, 7, or 8 functional groups, or any value or ranges of values therein.

For the purpose of the present invention, the at least one isocyanate component (A) is selected from the group consisting of at least one diisocyanate component (A1), at least one polymeric diisocyanate component (A2) and a mixture thereof. By the term "at least one diisocyanate component (A1), it is referred to monomeric form or a monomer of the diisocyanate.

Accordingly, in a preferable embodiment, the cast elastomer comprises the reaction product of:
(A1) 10 wt.-% to 98 wt.-% of at least one diisocyanate component,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one diisocyanate component in g,
$EW_{ICN}$ is the equivalent weight of the at least one diisocyanate component in g/eq,
n is the number of cross linker or chain extender and the diisocyanate component.

In a particularly preferable embodiment, the cast elastomer comprises the reaction product of:
(A2) 10 wt.-% to 98 wt.-% of at least one polymeric diisocyanate component,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the aromatic diisocyanate in g,
$EW_{ICN}$ is the equivalent weight of the at least one polymeric diisocyanate component in g/eq,
n is the number of cross linker or chain extender and the polymeric diisocyanate component.

In an embodiment, the at least one diisocyanate component (A1) comprises an aromatic diisocyanate (A11). The aromatic diisocyanate (A11) is selected from the group consisting of tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate and combinations thereof.

Preferably, the aromatic diisocyanate (A11) is selected from the group consisting of 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate and combinations thereof.

More preferably, the aromatic diisocyanate (A11) is selected from the group consisting of 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate and combinations thereof.

Most preferably, the aromatic diisocyanate (A11) is selected from the group consisting of m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate and combinations thereof.

In an embodiment, the aromatic diisocyanate (A11) is 4,4'-diphenylmethane diisocyanate (hereinafter referred as MDI). MDI is produced from aniline and formaldehyde feedstocks. Such methods are known to a person skilled in the art. The choice of MDI is not limited to any particular method for preparing the same. Accordingly, the person skilled in the art may obtain MDI by any suitable method.

In a preferable embodiment, the cast elastomer comprises the reaction product of:

(A11) 10 wt.-% to 98 wt.-% of 4,4'-diphenylmethane diisocyanate,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

$$\text{Hard segment content} = \{\Sigma_{x=1}{}^n[m_{CE}/EW_{CE}]/[m_{ICN}/EW_{ICN}]\} \times 100\% \{\Sigma_{x=1}{}^n[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of 4,4'-diphenylmethane diisocyanate in g,
$EW_{ICN}$ is the equivalent weight of 4,4'-diphenylmethane diisocyanate in g/eq,
n is the number of cross linker or chain extender and 4,4'-diphenylmethane diisocyanate.

For the purpose of the present invention, the at least one polymeric diisocyanate component (A2) may also be selected from the group consisting of polymeric diphenylmethane diisocyanates and polymeric toluene diisocyanate. By the term "polymeric", it is referred to the polymeric grade or form of the diisocyanate comprising different oligomers and homologues. For instance, polymeric diphenylmethane diisocyanate (hereinafter referred as polymeric MDI) typically comprises of 30 wt.-% to 80 wt.-% of MDI, while the remaining is MDI oligomers and MDI homologues. Similarly, by the term "polymeric diphenylmethane diisocyanate", it is referred to the polymeric grade or form of the different isomers of diphenylmethane diisocyanate such as, but not limited to, 2,2'-diphenylmethane diisocyanate, 4,4'-diphenylmethane diisocyanate, 2,4'-diphenylmethane diisocyanate and a combination thereof. Such polymeric diisocyanate component (A2) are available commercially in the market. The choice of the polymeric diisocyanate component (A2) is not limited to any particular method for preparing the same.

Accordingly, in an embodiment the cast elastomer comprises the reaction product of:
(A2) 10 wt.-% to 98 wt.-% of at least one polymeric diisocyanate component,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

$$\text{Hard segment content} = \{\Sigma_{x=1}{}^n[m_{CE}/EW_{CE}]/[m_{ICN}/EW_{ICN}]\} \times 100\% \{\Sigma_{x=1}{}^n[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one polymeric diisocyanate component in g,
$EW_{ICN}$ is the equivalent weight of the at least one polymeric diisocyanate component in g/eq,
n is the number of cross linker or chain extender and polymeric diisocyanate component.

The at least one isocyanate component (A), as described hereinabove, is present in an amount in the range of 10 wt.-% to 98 wt.-% based on the total weight of the cast elastomer. Preferably, the at least one isocyanate component (A) is present in an amount in the range of 13 wt.-% to 95 wt.-%, or 13 wt.-% to 92 wt.-%, or 13 wt.-% to 89 wt.-%, or 13 wt.-% to 86 wt.-%, or 13 wt.-% to 83 wt.-%, or 16 wt.-% to 83 wt.-% based on the total weight of the cast elastomer. More preferably, it is in the range of 16 wt.-% to 80 wt.-%, or 16 wt.-% to 77 wt.-%, or 16 wt.-% to 74 wt.-%, or 16 wt.-% to 71 wt.-%, or 19 wt.-% to 71 wt.-% based on the total weight of the cast elastomer. Most preferably, it is in the range of 19 wt.-% to 68 wt.-%, or 19 wt.-% to 65 wt.-%, or 19 wt.-% to 62 wt.-%, or 19 wt.-% to 59 wt.-%, or 21 wt.-% to 59 wt.-%, or 21 wt.-% to 56 wt.-%, or 21 wt.-% to 53 wt.-%, or 25 wt.-% to 53 wt.-%, or 25 wt.-% to 50 wt.-%, or 25 wt.-% to 47 wt.-% based on the total weight of the cast elastomer. In an embodiment, the at least one isocyanate component (A) is present in an amount in the range of 25 wt.-% to 45 wt.-% based on the total weight of the cast elastomer.

For the purpose of the present invention, the at least one isocyanate component (A) may have any % NCO content, any nominal functionality, any number average molecular weight, and any viscosity, depending on which at least one isocyanate component (A) is chosen. The term "% NCO content" has been interchangeably referred to as isocyanate content and/or NCO content in the description hereinbelow.

Preferably, the % NCO content of the at least one isocyanate component (A) is in the range of 2 wt.-% to 50 wt.-%. Determination of the % NCO contents on percent by weight is accomplished by standard chemical titration analysis known to those skilled in the art. It is to be understood that the at least one isocyanate component (A) may have any molecular weight.

Particularly, the % NCO content of the at least one diisocyanate component (A1) is in the range of 20 wt.-% to 50 wt.-%. In an embodiment, the aromatic diisocyanate (A11) has % NCO content in the range of 6 wt.-% to 45 wt.-%. In another embodiment, the at least one polymeric diisocyanate component (A2) has % NCO content in the range of 15 wt.-% to 35 wt.-%, more preferably in the range of 18 wt.-% to 35 wt.-%.

The at least one polyol component (B) is another important component in the cast elastomer. The at least one polyol component (B) has an average hydroxyl functionality of from 1, e.g. has 1 hydroxyl functional group that is reactive with the NCO functional group of the at least one isocyanate component (A). For the purpose of the present invention, the at least one polyol component (B) has a functionality in the range of 1 to 8. The functionality of the at least one polyol component is defined as the average number of isocyanate reactive sites per molecule. The at least one polyol component (B) having a functionality of 1 is a mono-hydroxy functional monol. Preferably, mono-hydroxy functional polyoxyethylene monols, mono-hydroxy functional polyoxyethylene-polyoxypropylene monol and a combination thereof can be used as the at least one polyol component (B) to obtain the present invention cast elastomer. The choice of the monol is not limited by the method for obtaining the same and a person skilled in the art is well aware of such methods. Moreover, the monohydroxy functional monols can also be obtained commercially, such as but not limited to, Carbowax™ MPEG from Dow.

Preferably, the at least one polyol component (B) has a functionality in the range of 2 to 8. The at least one polyol component (B) can have a hydroxyl number (or OH number) in the range of 10 mgKOH/g to 1000 mgKOH/g determined according to ASTM D4274 and a number average molecular weight (Mn) in the range of 250 g/mol to 10,000 g/mol. For the purpose of the present invention, the number average molecular weight of the at least one polyol component (B) is determined using titration methods. Such titration methods are well-known to the person skilled in the art and therefore the present invention is not limited by the same. The titration methods are used to determine the hydroxyl number, which are used to calculate the number average molecular weight according to the formula described hereinbelow:

$$\text{Molecular weight} = \frac{56100}{\text{OH number}} \times \text{functionality}$$

The at least one polyol component (B) is not particularly limited and is selected from the group consisting of polyether polyol (B1), polyester polyol (B2), natural oil polyol (B3), polydiene polyol (B4), copolymers and combinations thereof. Furthermore, the at least one polyol component (B) may be chosen from aliphatic polyols, cycloaliphatic polyols, aromatic polyols, heterocyclic polyols, and combinations thereof. Some examples of suitable polyols include, but are not limited to, glycol-initiated polyols, glycerine-initiated polyols, sucrose-initiated polyols, sucrose/glycerine-initiated polyols, trimethylolpropane-initiated polyols, and combinations thereof.

Suitable polyether polyol (B1) include products obtained by the polymerization of a cyclic oxide, such as ethylene oxide (EO), propylene oxide (PO), butylene oxide (BO), and tetrahydrofuran in the presence of a polyfunctional initiator. Suitable initiator compounds include a plurality of active hydrogen atoms, and include, but are not limited to, water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine and cyclohexane diamine.

Preferably, the polyether polyol (B1) is derived from monomer selected from the group consisting of ethylene oxide, propylene oxide, tetrahydrofuran and a mixture thereof. Accordingly, in an embodiment, the cast elastomer comprises the reaction product of:
(A) 10 wt.-% to 98 wt.-% of at least one isocyanate component,
(B1) 2 wt.-% to 90 wt.-% of polyether polyol,
(C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

Hard segment content=$\{\Sigma_{x=1}{}^n[m_{CE}/\text{EW}_{CE}]/[m_{ICN}/\text{EW}_{ICN}]\}\times 100\%\{\Sigma_{x=1}{}^n[m_{CE}/\text{EW}_{CE}]/[m_{ICN}/\text{EW}_{ICN}]\}\times 100\%$ wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

Other suitable polyether polyol (B1) include polyether diols and triols, such as polyoxypropylene diols and triols and poly(oxyethylene-oxypropylene)diols and triols obtained by simultaneous or sequential addition of ethylene and propylene oxides to di- or trifunctional initiators. Copolymers having oxyethylene contents of from about 5 to about 95% by weight, and copolymers having oxypropylene contents of from about 5 to about 100% by weight, based on the total weight of the at least one polyol component (B), may also be used. These copolymers may be block copolymers, random/block copolymers, or random copolymers.

In an embodiment, the polyether polyol (B1) is derived from tetrahydrofuran. The said polyether polyol (B1) includes polytetramethylene glycols obtained by the polymerization of tetrahydrofuran. In an alternative embodiment, the polyether polyol (B1) may be capped. The term "capped", as used herein, means that one or more terminals of the polyether polyol (B1) is occupied by, such as but not limited to, an alkylene oxide group. For instance, the polyether polyol (B1) may be capped with ethylene oxide. In a similar manner, the polyether polyol (B1) may be capped with ethylene oxide, propylene oxide, butylene oxide, and combinations thereof.

The polyether polyol (B1), as described hereinabove, can have a hydroxyl number in the range of 10 mgKOH/g to 1000 mgKOH/g determined according to ASTM D4274. Preferably, in the range of 30 mgKOH/g to 900 mgKOH/g, or in the range of 30 mgKOH/g to 800 mgKOH/g determined according to ASTM D4274. More preferably in the range of 30 mgKOH/g to 500 mgKOH/g, or in the range of 30 mgKOH/g to 400 mgKOH/g determined according to ASTM D4274. Most preferably in the range of 30 mgKOH/g to 300 mgKOH/g, or in the range of 30 mgKOH/g to 150 mgKOH/g determined according to ASTM D4274. Suitable polytetrahydrofuran/polyTHF include, but are not limited to, polyTHF commercially available from BASF Corporation of Wyandotte, Mich. under the trade name polyTHF®.

For the purpose of the present invention, the polyether polyol (B1) has a number average molecular weight Mn in the range of 250 g/mol to 10,000 g/mol Preferably, it is in the range of 500 g/mol to 9,500 g/mol, or 550 g/mol to 9,500 g/mol, or 550 g/mol to 9,000 g/mol, or 600 g/mol to 9,000 g/mol. More preferably, it is in the range of 600 g/mol to 8,500 g/mol, or 650 g/mol to 8,500 g/mol, or 650 g/mol to 8,000 g/mol, or 700 g/mol to 8,000 g/mol. Most preferably, it is in the range of 700 g/mol to 7,500 g/mol, or 750 g/mol to 7,500 g/mol, or 750 g/mol to 7,000 g/mol, or 750 g/mol to 6,500 g/mol, or 750 g/mol to 6,000 g/mol, or 750 g/mol to 5,500 g/mol, or 750 g/mol to 5,000 g/mol, or 800 g/mol to 4,500 g/mol, or 850 g/mol to 4,000 g/mol, or 850 g/mol to 3,500 g/mol. In an embodiment, the polyether polyol (B1) has a number average molecular weight Mn in the range of 900 g/mol to 3,000 g/mol.

Suitable polyester polyol (B2) is selected from the group consisting of reaction product of polyhydric alcohol, polymerization product of lactone and polymerization product of di-carboxylic acids with polyhydric alcohols. By the term "lactone", it is referred to cyclic esters of hydroxycarboxylic acids. Such polyester polyol (B2) include hydroxyl-terminated reaction products of polyhydric alcohols, polyester polyols obtained as the polymerization product of lactone, e.g. caprolactone, in conjunction with a polyol, and polyester polyols obtained by the polymerization of a di-carboxylic acid, e.g. adipic acid, with a polyhydric alcohol. Polyesteramide polyols, polythioether polyols, polyester polyols, polycarbonate polyols, polyacetal polyols, polycaprolactone, and polyolefin polyols may also be used.

Accordingly, in an embodiment the cast elastomer comprises the reaction product of:

(A) 10 wt.-% to 98 wt.-% of at least one isocyanate component, (B2) 2 wt.-% to 90 wt.-% of polyester polyol, (C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and (D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

In another preferable embodiment, the cast elastomer comprises the reaction product of:

(A) 10 wt.-% to 98 wt.-% of at least one isocyanate component, (B2) 2 wt.-% to 90 wt.-% of polymerization product of lactone, (C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and (D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}{}^{n}[m_{CE}/EW_{CE}]/[m_{ICN}/EW_{ICN}]\} \times 100\% \{\Sigma_{x=1}{}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

In another preferable embodiment, the cast elastomer comprises the reaction product of:

(A) 10 wt.-% to 98 wt.-% of at least one isocyanate component, (B2) 2 wt.-% to 90 wt.-% of polymerization product of caprolactone, (C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and (D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}{}^{n}[m_{CE}/EW_{CE}]/[m_{ICN}/EW_{ICN}]\} \times 100\% \{\Sigma_{x=1}{}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

In an alternate embodiment, the at least one polyol component (B) is (or comprises) a polyester polyol obtained by the polymerization of lactones, e.g. caprolactone, in conjunction with a polyol, and polyester polyols obtained by the polymerization of a di-carboxylic acid, e.g. adipic acid, with a polyhydric alcohol. In one preferred embodiment, the at least one polyol component (B) is or comprises a polyester polyol (B2) obtained by the polymerization of caprolactone, i.e., a caprolactone based polyol. In another preferred embodiment, the at least one polyol component (B) is polyol formed from tetrahydrofuran and/or caprolactone. In a particularly preferable embodiment, the at least one polyol component (B) is or comprises a copolymer of the polyether polyol (B1) derived from tetrahydrofuran and the polyester polyol (B2) as the polymerization product of caprolactone. In an embodiment, the copolymer of the polyether polyol (B1) derived from tetrahydrofuran and the polyester polyol (B2) as the polymerization product of caprolactone is a block copolymer.

Accordingly, in a particularly preferable embodiment, the cast elastomer comprises the reaction product of:

(A) 10 wt.-% to 98 wt.-% of at least one isocyanate component, 2 wt.-% to 90 wt.-% of a copolymer of the polyether polyol (B1) and the polyester polyol (B2), (C) 0.1 wt.-% to 20 wt.-% of graphene nano platelets having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and (D) 1 wt.-% to 30 wt.-% of at least one cross-linker or a chain extender, wherein the wt.-% is based on the total weight of the cast elastomer and wherein the cast elastomer has a hard segment content in the range of 50% to 97%, the hard segment content being defined by the formula:

$$\text{Hard segment content} = \{\Sigma_{x=1}{}^{n}[m_{CE}/EW_{CE}]/[m_{ICN}/EW_{ICN}]\} \times 100\% \{\Sigma_{x=1}{}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

For the purpose of the present invention, the polymerization product of caprolactone has a hydroxyl number in the range of 30 mgKOH/g to 1000 mgKOH/g determined according to ASTM D4274 and a number average molecular weight Mn in the range of 400 g/mol to 8000 g/mol. Preferably, the hydroxyl number is in the range of 30 mgKOH/g to 900 mgKOH/g, or in the range of 30 mgKOH/g to 800 mgKOH/g determined according to ASTM D4274. More preferably in the range of 30 mgKOH/g to 500 mgKOH/g, or in the range of 30 mgKOH/g to 400 mgKOH/g determined according to ASTM D4274. Most preferably in the range of 30 mgKOH/g to 300 mgKOH/g, or in the range of 30 mgKOH/g to 150 mgKOH/g determined according to ASTM D4274.

Preferably, Mn is in the range of 500 g/mol to 7000 g/mol. More preferably, it is in the range of 1000 g/mol to 6000 g/mol. Most preferably, it is in the range of 1000 g/mol to 5000 g/mol, or 1500 g/mol to 4000 g/mol. In a particularly preferable embodiment, the polymerization product of caprolactone has a number average molecular weight Mn in the range of 1500 g/mol to 3000 g/mol.

Natural oil polyol (B3), also known as biopolyol, can also be used as the at least one polyol component (B) in the present invention. Natural oil polyol (B3) is not a petroleum-based polyol, i.e. a polyol derived from petroleum products and/or petroleum by-products. In general, there are a few naturally occurring vegetable oils that include unreacted OH functional groups, and castor oil is typically commercially available and is produced directly from a plant source that has sufficient OH functional group content to make castor oil suitable for direct use as a polyol in urethane chemistry. Most, if not all, other Natural oil polyol (B3) require chemical modification of the oils directly available from plants. The Natural oil polyol (B3) is typically derived from any natural oil, such as from a vegetable or nut oil. Examples of suitable natural oils include castor oil, and Natural oil polyol (B3) derived from soybean oil, rapeseed oil, coconut oil, peanut oil, canola oil, etc. Employing such natural oils can be useful for reducing environmental footprints.

Preferably the natural oil polyol (B3) is a polyol derived from castor oil, and in certain embodiments purified castor oil which has been purified to remove residual water. As referred to hereinafter, the term "castor oil" refers to both unpurified and purified castor oil. Those skilled in the art appreciate that castor oil inherently includes OH functional groups whereas other natural oil polyols may require one or more additional processing steps to obtain OH functional groups.

Castor oil is a renewable raw material and is obtained from the seeds of the castor oil plant. Castor oil is in essence a triglyceride of a fatty acid mixture comprising, based on the total weight of the fatty acid mixture, >75% by weight of ricinoleic acid, from 3 to 10% by weight of oleic acid, from 2 to 6% by weight of linoleic acid, from 1 to 4% by weight of stearic acid, from 0 to 2% by weight of palmitic acid, and also optionally small quantities, in each case less than 1% by weight, of other fatty acids such as linolenic acid, vaccenic acid, arachic acid, and eicosenoic acid.

Preferably the natural oil polyol (B3) is the alkoxylation product of a natural oil polyol, more preferably the alkoxylation product of castor oil. The alkoxylation is preferably achieved in that the natural oil polyol, preferably castor oil, is alkoxylated with the aid of a nucleophilic and/or basic catalyst and of at least one alkylene oxide. Preferably, the alkylene oxide is selected from the group consisting of butylene 1,2-oxide, propylene oxide and ethylene oxide. Preferably, the basic and/or nucleophilic catalyst is selected from the group consisting of alkali metal hydroxides and alkaline earth metal hydroxides, alkali metal alkoxides and alkaline earth metal alkoxides, tertiary amines, N-heterocyclic carbenes, and precursors of N-heterocyclic carbenes.

In some examples, the at least one polyol component (B) includes a graft polyol. In one example, the graft polyol is a polymer polyol. In other examples, the graft polyol is chosen from the group of polyharnstoff (PHD) polyols, polyisocyanate polyaddition (PIPA) polyols, and combinations thereof. Graft polyols may also be referred to as graft dispersion polyols or graft polymer polyols. In one example, the at least one polyol component (B) includes a styrene-acrylonitrile graft polyol.

The cast elastomer of the present invention comprises the at least one polyol component (B), as described hereinabove, in an amount in the range of 2 wt.-% to 90 wt.-% based on the total weight of the cast elastomer. Preferably, it is in the range of 5 wt.-% to 90 wt.-%, or 5 wt.-% to 87 wt.-%, or 8 wt.-% to 87 wt.-%, or 8 wt.-% to 84 wt.-%, or 11 wt.-% to 82 wt.-%, or 14 wt.-% to 82 wt.-%, or 17 wt.-% to 82 wt.-%, or 21 wt.-% to 82 wt.-% based on the total weight of the cast elastomer. More preferably, it is in the range of 24 wt.-% to 82 wt.-%, or 24 wt.-% to 81 wt.-%, or 27 wt.-% to 81 wt.-%, or 27 wt.-% to 80 wt.-%, or 30 wt.-% to 80 wt.-% based on the total weight of the cast elastomer. Most preferably, it is in the range of 30 wt.-% to 79 wt.-%, or 33 wt.-% to 79 wt.-%, or 33 wt.-% to 78 wt.-%, or 36 wt.-% to 78 wt.-%, or 36 wt.-% to 77 wt.-%, or 39 wt.-% to 77 wt.-%, or 39 wt.-% to 76 wt.-%, or 40 wt.-% to 76 wt.-%, 40 wt.-% to 75 wt.-%, 40 wt.-% to 73 wt.-% based on the total weight of the cast elastomer. In an embodiment, the at least one polyol component (B) is present in an amount in the range of 40 wt.-% to 70 wt.-% based on the total weight of the cast elastomer.

The cast elastomer, as described hereinabove, also comprises graphene nano platelets (C), hereinafter also referred as GNP. The modulus of the cast elastomer can be increased through nucleation and reinforcement of the hard segment with the graphene nano platelets (C). The combination of graphene nano platelets (C) with a sufficiently high hard segment content produces a harder, higher modulus material with an increased use range of the at least one isocyanate (A) and the at least one polyol component (B). These gains in material properties are made with no sacrifice to the properties of the cast elastomer.

One or more different types of GNP can be included in an isocyanate prepolymer or the cast elastomer formed. Graphene nano platelets (C) is an oxidized form of graphene, functionalized with oxygen-containing groups. Typically, the GNP have an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets (C).

In some embodiments, the GNP can be described as having a single platelet structure, i.e., single atomic layer structure. In alternate embodiments, the GNP can be described as having a multi-platelet structure.

In some embodiments, functionalized GNP can be used to form the isocyanate prepolymer. There are many ways in which the GNP can be functionalized, depending on the desired application. For example, it is possible to substitute amines for the organic covalent functionalization of graphene to increase the dispersibility of the GNP. In some embodiments, the GNP is synthesized with one of four basic methods by Staudenmaier, Hofmann, Brodie, or Hummers.

While, in some embodiments the GNP comprises a single-atomic layered material, comprising carbon and hydrogen. In other embodiments, the GNP comprises a double-atomic layered material, comprising carbon and hydrogen. Preferably, the GNP comprises 1, 2, 3, 4, 5, 6, 7, 8, 9, 10, 11, 12, 13, 14, 15, or more atomic layers, comprising carbon and hydrogen. In embodiments having a multi-layer structure, the oxygen content is typically active, i.e., located on an exterior surface of the GNP. Oxygen content within the layers can be shielded from interaction with reactants used to form the cast elastomer, as described hereinabove. For the purpose of the present invention, the term "reactant" or "reactants", as used hereinabove and hereinbelow, refers to essential components (A), (B), (C) and (D) in the cast elastomer of the present invention.

The graphene nano platelets (C), as described hereinabove, have an oxygen content in the range of 0.01 wt.-% to 10 wt.-% based on the total weight of the graphene nano platelets (C). Preferably, the oxygen content is in the range of 0.1 wt.-% to 10 wt.-% based on the total weight of the graphene nano platelets (C). More preferably, it is in the range of 0.1 wt.-% to 8 wt.-% based on the total weight of the graphene nano platelets (C). Most preferably, it is in the range of 0.5 wt.-% to 8 wt.-%, or 0.5 wt.-% to 6 wt.-%, or 1 wt.-% to 6 wt.-% based on the total weight of the graphene nano platelets (C). In an embodiment, graphene nano platelets (C) have an oxygen content in the range of 1 wt.-% to 5 wt.-% based on the total weight of the graphene nano platelets (C).

The graphene nano platelets (C), as described hereinabove, have an average lateral dimension (x, y) in the range of 1 µm to 100 µm determined by atomic force microscope according to ASTM E2859. By the term "lateral dimension (x, y)", it is referred to the dimension measured across the plane created by the x-axis and the y-axis in the cartesian coordinate system. Preferably, in the range of 3 µm to 60 µm determined by atomic force microscope according to ASTM E2859. More preferably, in the range of 5 µm to 40 µm determined by atomic force microscope according to ASTM E2859. Most preferably, in the range of 7 µm to 25 µm determined by atomic force microscope according to ASTM E2859.

The average through-plane dimension (z) of the graphene nano platelets (C) is in the range of 1 nm to 100 nm determined by atomic force microscope according to ASTM E2859. By the term "through-plane dimension (z)", it is referred to the dimension perpendicular to the lateral dimension (x, y). Preferably, it is in the range of 5 nm to 100 nm determined by atomic force microscope according to ASTM E2859. More preferably, it is in the range of 1 nm to 100 nm determined according to atomic force microscope. Most preferably, it is in the range of 1 nm to 45 nm determined by atomic force microscope according to ASTM E2859.

In an embodiment, the graphene nano particles (C) may be in the form of a powder or in the form of a dispersion, also described hereinabove. For the purpose of the present invention, the graphene nano-particles (C) are dispersed in the at least one polyol component (B) and/or the at least one cross-linker or a chain extender. Accordingly, the present invention does not require any additional solvent to disperse the graphene nano particles (C). Although it is preferred that the dispersion is homogeneous, it might be possible that agglomeration of the graphene nano particles (C) is unavoidable. The presence of agglomerates of graphene nano particles (C) does not alters the mechanical performance of the resulting cast elastomer. This is another advantage of the present invention.

In a preferable embodiment, the cast elastomer comprises the reaction product of:
(A) 10 wt.-% to 98 wt.-% of at least one isocyanate component,
(B) 2 wt.-% to 90 wt.-% of at least one polyol component,
(C) 0.1 wt.-% to 20 wt.-% of graphene nano platelets in the form of a powder, having an average lateral dimension (x, y) in the range of 1 µm to 100 µm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one isocyanate component in g,
$EW_{ICN}$ is the equivalent weight of the at least one isocyanate component in g/eq,
n is the number of cross linker or chain extender and the isocyanate.

In another preferable embodiment, the cast elastomer comprises the reaction product of:
(A) 10 wt.-% to 98 wt.-% of at least one isocyanate component,
(B) 2 wt.-% to 90 wt.-% of at least one polyol component,
(C) 0.1 wt.-% to 20 wt.-% of graphene nano platelets in the form of a dispersion, having an average lateral dimension (x, y) in the range of 1 nm to 100 nm determined by atomic force microscope according to ASTM E2859, an average through-plane dimension (z) in the range of 5 µm to 100 µm determined by atomic force microscope according to ASTM E2859 and an oxygen content in the range of 0.01% to 10% by weight, based on the total weight of the graphene nano platelets, and
(D) 1 wt.-% to 30 wt.-% of at least one cross-linker or a chain extender,
wherein the wt.-% is based on the total weight of the cast elastomer and
wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one isocyanate component in g,
$EW_{ICN}$ is the equivalent weight of the at least one isocyanate component in g/eq,
n is the number of cross linker or chain extender and the isocyanate,
wherein the dispersion is in the at least one polyol component (B) and/or the at least one cross-linker or a chain extender (D).

For the purpose of the present invention, the graphene nano platelets (C) is present in an amount in the range of 0.1 wt.-% to 20 wt.-% based on the total weight of the cast elastomer. Preferably, it is in the range of 0.1 wt.-% to 18 wt.-%, or 0.1 wt.-% to 16 wt.-% based on the total weight of the cast elastomer. More preferably, it is in the range of 0.1 wt.-% to 14 wt.-%, or 0.1 wt.-% to 12 wt.-% based on the total weight of the cast elastomer. Most preferably, it is in the range of 0.1 wt.-% to 10 wt.-%, or 0.1 wt.-% to 8 wt.-%, or 0.1 wt.-% to 6 wt.-% based on the total weight of the cast elastomer. In an embodiment, the graphene nano platelets (C) is present in an amount in the range of 0.1 wt.-% to 5 wt.-% based on the total weight of the cast elastomer.

The cast elastomer of the present invention also comprises at least one cross-linker or a chain extender (D). Difunctional compounds are considered chain extenders, while compounds with higher functionality are considered cross-linkers.

The at least one cross-linker or the chain extender (D) in the cast elastomer generally produce high melting segments called hard segments, which are believed to result from an increased intermolecular association or bonding within the polymer. Intermolecular association or bonding can be by covalent or hydrogen bonds. An amount of the at least one cross-linker or the chain extender (D) is generally chosen to achieve preselected processing characteristics, preselected hardness, and other preselected physical properties in the final cast elastomer.

For the purpose of the present invention, the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, hydroquinone bis(2-hydroxyethyl)ether (HQEE), bis-(hydroxy-methyl-cyclohexane), hexanediol, thiodiglycol, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine, ethanol amine, aminopropyl alcohol, 2,2-dimethyl propanol amine, 3-aminocyclohexyl alcohol, p-aminobenzyl alcohol, glycerine, trimethylolpropane (TMP), pentaerythritol, dimethylthiotoluenediamine, 3,5-diethyltoluene-2,4-diamine, 3,5-diethyltoluene-2,6-diamine, 2-methyl-1,3-propanediol, 4,4'-methylenebis(2-chloroanaline), 1,3-propanediol, castor oil, tetrahydroxypropylethylenediamine, triisopropanolamine, triethanolamine and a mixture thereof. The person skilled in the art is well aware of these at least one cross-linker or the chain extender (D) and therefore the present invention cast elastomer is not limited by the method employed to obtain them.

Preferably, the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, hydroquinone bis(2-hydroxyethyl)ether (HQEE), bis-(hydroxy-methylcyclohexane), hexanediol, thiodiglycol, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine, ethanol amine, aminopropyl alcohol, 2,2-dimethyl propanol amine, 3-aminocyclohexyl alcohol and a mixture thereof.

More preferably, the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, hydroquinone bis(2-hydroxyethyl)ether (HQEE), bis-(hydroxy-methyl-cyclohexane), hexanediol, thiodiglycol, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine, ethanol amine and a mixture thereof.

Most preferably, the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, bis-(hydroxy-methyl-cyclohexane), hydroquinone bis(2-hydroxyethyl)ether (HQEE), hexanediol, thiodiglycol and a mixture thereof.

In a particularly preferred embodiment, the at least one cross-linker or the chain extender (D) is selected from the group consisting of ethylene glycol, propylene glycol, butylene glycol, 1,4-butanediol (BDO), 1,3-butanediol, and hydroquinone bis(2-hydroxyethyl)ether (HQEE).

For the purpose of the present invention, the amount of the at least one cross-linker or the chain extender (D) is in the range of 1 wt.-% to 30 wt.-% based on the total weight of the cast elastomer. Preferably, it is in the range of 1 wt.-% to 28 wt.-%, or 1.5 wt.-% to 28 wt.-%, or 1.5 wt.-% to 26 wt.-%, or 2 wt.-% to 26 wt.-%, or 2 wt.-% to 24 wt.-% based on the total weight of the cast elastomer. More preferably, it is in the range of 2.5 wt.-% to 24 wt.-%, or 2.5 wt.-% to 22 wt.-%, or 3 wt.-% to 22 wt.-%, or 3 wt.-% to 20 wt.-%, or 3.5 wt.-% to 20 wt.-% based on the total weight of the cast elastomer. Most preferably, it is in the range of 3.5 wt.-% to 18 wt.-%, or 4 wt.-% to 18 wt.-%, or 4 wt.-% to 16 wt.-%, or 4.5 wt.-% to 16 wt.-%, or 4.5 wt.-% to 14 wt.-%, or 5 wt.-% to 14 wt.-%, or 5 wt.-% to 12 wt.-%, or 5.5 wt.-% to 12 wt.-% based on the total weight of the cast elastomer. In an embodiment, the amount of the at least one cross-linker or the chain extender (D) is in the range of 6 wt.-% to 12 wt.-% based on the total weight of the cast elastomer.

The cast elastomer, as described hereinabove, may further comprise at least one additive (E) along with other reactants (A), (B), (C) and (D). Suitable additives that may be employed include, but are not limited to, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, acidifiers, thixotropic agents, transition metals, catalysts, blowing agents, surfactants, cross-linkers, inert diluents, and combinations thereof. Other additives such as, but not limited to, carbodiimides to reduce hydrolysis, hindered phenols and hindered amine light stabilizers to reduce oxidation and yellowing, benzotriazoles to increase UV light stabilization, glass fillers, and salts of sulfonic acid to increase antistatic properties of the present invention cast elastomer. The choice and the amount of the at least one additive (E), as described hereinabove, is well-known to the person skilled in the art and shall not be limiting the present invention cast elastomer. Moreover, the present invention is also not limited by the method employed to obtain these at least one additives (E).

Therefore, in another embodiment the cast elastomer comprises the reaction product of:
(A) 10 wt.-% to 98 wt.-% of at least one isocyanate component,
(B) 2 wt.-% to 90 wt.-% of at least one polyol component,
(C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01% to 10% by weight, based on the total weight of the graphene nano platelets, (D) 1 wt.-% to 30 wt.-% of at least one cross-linker or a chain extender, and at least one additive, wherein the wt.-% is based on the total weight of the cast elastomer and the components (A), (B), (C), (D) and (E) all add up to 100 wt.-%, and wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

In another aspect of the present invention, a process for preparing the cast elastomer, as described hereinabove, comprises the steps of:

(A') preparing an isocyanate prepolymer comprising the at least one isocyanate component (A), the at least one polyol component (B) and the graphene nano platelets (C),
wherein the isocyanate prepolymer has an isocyanate index in the range of 1 to 300, and (B') reacting the isocyanate prepolymer of step (A') with the at least one cross-linker or the chain extender (D) to obtain a cast elastomer having a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate, wherein the graphene nanoplatelets (C) have an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01 wt.-% to 10 wt.-% based on the total weight of the graphene nano platelets (C).

Typically, prepolymers are the reaction product of a polyol or blend of polyols with excess isocyanate. Prepolymers are made by the slow addition of the polyol or blends of polyols to the isocyanate at a controlled temperature followed by reaction at a constant free NCO content. Catalysts may be used to accelerate the reaction. The use of the prepolymer is distinctly advantageous to lower the overall reaction exotherm. The last step is a reaction of the prepolymer with a chain extender to produce high molecular weight polymers. In many cases, controlled cross-linking is introduced as the second or third step.

The present invention process is a two-step process i.e. a prepolymer process, more precisely an isocyanate prepolymer process and is substantially free of any solvent. The isocyanate prepolymer comprises the reaction product of the at least one isocyanate component (A), the at least one polyol component (B), and the graphene nano platelets (C). In some embodiments, the at least one isocyanate component (A) and the at least one polyol component (B) are reacted at an isocyanate index in the range of 1 to 300.

Preferably, the at least one isocyanate component (A) and the at least one polyol component (B) are reacted at an isocyanate index in the range of 1.5 to 150, more preferably in the range of 2 to 50. For the purpose of the present invention, isocyanate index is defined as the ratio of NCO groups in the isocyanate to the OH groups in the at least one polyol component (B) of the isocyanate-reactive composition. In an embodiment, the isocyanate prepolymer as described hereinabove may further comprise the at least one cross-linker or the chain extender (D) as well. Accordingly, the term "isocyanate-reactive composition" refers to the mixture of components (A), (B), (C) and optionally (D).

The isocyanate prepolymer, as described hereinabove, has an isocyanate (NCO) content in the range of 2 wt.-% to 50 wt.-%. Preferably, in the range of 4 wt.-% to 45 wt.-%. Most preferably, in the range of 4 wt.-% to 40 wt.-%. Most preferably, in the range of 5 wt.-% to 40 wt.-%, or 5 wt.-% to 35 wt.-%, or 6 wt.-% to 30 wt.-%. Determination of the % NCO contents on percent by weight is accomplished by standard chemical titration analysis known to the person skilled in the art.

The method of forming the isocyanate prepolymer is typically robust and can be performed with various orders of addition of reactants and with standard mix energies. In many embodiments, the method is conducted under inert conditions, e.g. under vacuum or with inert gas.

In an embodiment, the isocyanate prepolymer can be obtained by:

(A1') mixing the at least one polyol component (B) and the graphene nanoplatelets (C) to obtain an isocyanate reactive mixture, (A2') adding the isocyanate reactive mixture of step (A1') and the at least one isocyanate component (A) optionally in the presence of the at least one crosslinker or the chain extender (D) to obtain an isocyanate prepolymer having an NCO content in the range of 2 wt.-% to 50 wt.-%.

In several embodiments, the isocyanate prepolymer has a weight average molecular weight Mw in the range of 100 to 5000 g/mol determined by standard chemical titration analysis. Preferably, it is in the in the range of 200 to 4000 g/mol. More preferably, it is in the range of 300 to 3000 g/mol. Most preferably, in the range of 400 to 3000 g/mol, or 500 to 2100 g/mol.

For the purpose of the present invention, in step (A1') the at least one polyol component (B) and the graphene nanoplatelets (C) can be added in any order and in any manner i.e. either dropwise or all at once. The person skilled in the art is well aware of this and therefore the present invention process shall not be limited by the same. Moreover, the step (A1') of the above described process can be carried out in the presence of any mixing means, such as but not limited to, a stirrer. The choice of such mixing means is also known to the person skilled in the art.

The isocyanate reactive mixture obtained in step (A1') is added to the at least one isocyanate component (A) to obtain an isocyanate prepolymer in step (A2'). Said isocyanate prepolymer have an NCO content in the range of 2 wt.-% to 50 wt.-% and a weight average molecular weight Mw in the range of 100 to 5000 g/mol. Optionally, the step (A2') may take place in the presence of the at least one cross-linker or the chain extender (D), as described hereinabove.

In another embodiment, in step (A') the graphene nano platelets (C) are first mixed with the at least one isocyanate component (A) to obtain a mixture. The mixture so obtained, is then added to the at least one polyol component (B) optionally in the presence of the at least one cross-linker or the chain extender (D) to obtain the isocyanate prepolymer having an NCO content in the range of 2 wt.-% to 50 wt.-% and a weight average molecular weight Mw in the range of 100 to 5000 g/mol.

In yet another embodiment, the total weight of the at least one polyol component (B) reacted to form the isocyanate prepolymer is divided into a first portion comprising the at least one polyol component (B) and a second portion comprising the remaining at least one polyol component (B) and the graphene nano platelets (C) reacted to form the isocyanate prepolymer. That is, total weight of the at least one polyol component (B) reacted to form the isocyanate prepolymer is divided into a first portion comprising virgin at least one polyol component (B) and a second portion comprising pre-blended at least one polyol component (B) and graphene nano platelets (C) in a higher concentration prior to batching. In such an embodiment, first mixing the at least one isocyanate component (A) with the first portion (starting the batch with the virgin at least one polyol component (B)) to form a reaction mixture and subsequently mixing the second portion with the reaction mixture to form the isocyanate prepolymer or cast elastomer (finishing the batch with mixture of at least one polyol component (B) having a high concentration of graphene nano platelets (C)) is done.

In still another embodiment, the at least one polyol component (B) is divided into more than two portions, wherein at least one portion comprises pre-blended at least one polyol component (B) and the graphene nano-platelets (C) and subsequently added with the at least one isocyanate component (A) to form the reaction mixture. The remaining portion is then added to the reaction mixture to form the isocyanate prepolymer. This is done to prevent the exothermic nature of the reaction between the at least one polyol component (B) and the at least one isocyanate component (A).

For the purpose of the present invention, the step (B') is also interchangeably referred to as the reaction step. In the reaction step, the isocyanate prepolymer, as obtained by any of the embodiments described hereinabove, is reacted with the at least one cross-linker or the chain extender (D) to obtain the cast elastomer. The isocyanate prepolymer in step (B') is heated to a temperature in the range of 20° C. to 150° C.

In an alternate embodiment, the graphene nano platelets (C) are added in step (A') or in step (B') or in both. This implies that in an embodiment of the present invention, the graphene nano platelets (C) can be added in the isocyanate prepolymer step or step (A'). In another embodiment, the graphene nano platelets (C) can be added in the reaction step or step (B'). In a further embodiment, the graphene nano platelets (C) can be added in both i.e. step (A') as well as step (B'). Accordingly, the present invention is advantageous in the sense that the graphene nano platelets can be added at any step.

The method of forming the isocyanate prepolymer can be described as substantially free of, or free of, additional dispersants or processing aids. Advantageously, additional dispersants or processing aids are not required to disperse the graphene nano platelets (C) in the isocyanate prepolymer or the cast elastomer formed therefrom, as described hereinabove.

The method of forming the isocyanate prepolymer includes graphene nano platelets (C) which is thoroughly dispersed in both the at least one polyol component (B) and the at least one isocyanate component (A). As such, the isocyanate prepolymer has (1) non-packing attributes; (2) stable viscosity over a broad range of temperatures, storage conditions, and times; and (3) stable NCO content (i.e. % NCO) over a broad range of temperatures, storage conditions, and times.

The cast elastomer, as obtained by the process described hereinabove, can be further subjected to the step of:
(C') post curing the cast elastomer of step (B') for a duration in the range of 0.1 h to 24 h at a temperature in the range of 100° C. to 200° C.

In at least one of the embodiments described hereinabove, the graphene nano particles (C) may be in the form of a powder or in the form of a dispersion, also described hereinabove. For the purpose of the present invention, the graphene nanoparticles (C) are dispersed in the at least one polyol component (B) and/or the at least one cross-linker or a chain extender. Accordingly, the present invention does not require any additional solvent to disperse the graphene nano particles (C), thereby making the present invention process substantially free or in fact free of any solvents. Although, it is preferred that the dispersion is homogeneous, it might be possible that agglomeration of the graphene nano particles (C) is unavoidable. The presence of agglomerates of graphene nano particles (C) does not alters the mechanical performance of the resulting cast elastomer.

In an embodiment, the step (A') and/or step (B'), independent of one another, takes place in the presence of optionally the at least one additive (E) and/or at least one catalyst (F). Such a choice and amount of the at least one additive (E) and/or the at least one catalyst (F) is well known to the person skilled in the art and therefor, the present invention process is not limited by the method employed to obtain them. Commercially available at least one catalyst, such as but not limited to, DABCO® from Evonik Industries may also be employed.

In some embodiments, the isocyanate prepolymer is substantially free of any solvents known in the art. The terminology "substantially free," as used hereinabove, refers to an amount of less than 10,000, less than 5,000, less than 1,000, less than 100, or less than 10, ppm based on the total weight of the isocyanate prepolymer.

The hard segment content, also interchangeably referred as hard block content, is the portion or polymer domain of the cast elastomer with a higher degree of hydrogen bonding interaction. These polymer domains are formed from the phase separation of the chain extender, e.g. a short-chain di-functional chain extender, and the at least one isocyanate component (A), which form the hard block. The remaining portions of the cast elastomer typically comprise long-chain at least one polyol component (B) and are referred to as soft-segment. The interactions between the hard block (with a higher degree of hydrogen bonding hydrogen) and the soft segments form semi-crystalline portions or domains in the cast elastomer, which provide the rigidity and physical resistance to forces acting on the polymer, including modulus and tear properties.

The percentage of hard block within the cast elastomer may be calculated from the molar equivalence of the total isocyanate groups contributed by the isocyanate in the cast elastomer to the hydroxyl equivalence of the chain extender in the cast elastomer. The interactions between the graphene nano platelets (C) and the at least one isocyanate component (A) in the isocyanate prepolymer allow for the graphene nano platelets (C) to act as a nucleation site for the formation of hard block. By increasing the free NCO in the prepolymer, there becomes the potential to form more hard block content in the polymer matrix. In turn, more hard block content allows for more of the graphene nano platelets (C) to act as a nucleation agent. This increases the potential effective loading of the graphene nano platelets (C) into the prepolymer by having more potential hard segment interaction to form with the graphene nano platelets (C).

The examples below show that the hard block content can be increased through percent NCO and increasing the level of graphene nano platelets (C). It is believed that there is a direct connection between the increase in hard block content, and the effective amount of graphene nano platelets (C) in the cast elastomer. To this end, use of a minimal amount of graphene nano platelets (C) in the isocyanate prepolymer increases the hard block morphology of the cast elastomer. This increase in hard block content improves many of the physical properties of the cast elastomer without negatively impacting other properties. For example, the interaction between the hard block domains and the graphene nano platelets (C) within the cast elastomer provides increased modulus and tear resistance while maintaining tensile and elongation properties. Further, the interaction between the hard block domains and the graphene nano platelets (C) within the cast elastomer provides excellent processing properties (processability) and increases thermal properties including onset to melt, melt temperature, and the enthalpy of melting. Such rheological, physical, and thermal properties can be attributed to an increased crystallinity of the hard block domains in the cast elastomer.

For the purpose of the present invention, the hard block content may be interchangeably referred as hard segment content. The hard segment content, as reported hereinabove, is defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein, $m_{CE}$ is the mass of the at least one cross linker or the chain extender in g, $EW_{CE}$ is the equivalent weight of the at least one cross linker or the chain extender in g/eq, $m_{ICN}$ is the mass of the at least one isocyanate component in g, $EW_{ICN}$ is the equivalent weight of the at least one isocyanate component in g/eq, n is the number of cross linker or chain extender and the isocyanate.

In the above formula, $EW_{CE}$ is further defined by the formula:

$$EW_{CE} = 56100/(OH_{CE})$$

wherein, $OH_{CE}$ is the hydroxyl number or OH number of the at least one cross linker or the chain extender determined according to ASTM D4274, in mgKOH/g.

Further in the above formula, $EW_{ICN}$ is defined by the formula:

$$EW_{ICN} = 4202/(\% NCO \times 100)$$

wherein,

% NCO is the % NCO content in the at least one isocyanate component.

In many embodiments the cast elastomer has: a Shore A Hardness in the range of 60 to 99, alternatively in the range of 80 to 99 as determined according to ASTM D2240; a Shore D Hardness in the range of 16 to 85 as determined according to ASTM D2240; a specific gravity in the range of 1.05 g/cm3 to 1.35 g/cm3, alternatively in the range of 1.05 g/cm3 to 1.25 g/cm3, alternatively in the range of 1.05 g/cm3 to 1.15 g/cm3; a tensile strength in the range of 100 psi to 40000 psi, alternatively in the range of 2000 psi to 10000 psi at 23° C. as determined by ASTM D412; a Taber abrasion resistance in the range of 2 mg to 100 mg, alternatively in the range of 2 mg to 50 mg, and more typically in the range of 2 mg to 30 mg determined according to ASTM D4060; and/or a tear strength in the range of 100 lb-f/in to 2000 lb-f/in at 25° C. as determined according to ASTM D624.

Further, the present invention cast elastomer has a Tg in the range of −60° C. to 10° C. determined by dynamic mechanical thermal analysis at a heating rate of 3° C./min at 0.3% strain and a frequency of 1 Hz torsion mode. Dynamic mechanical thermal analysis (DMTA) or dynamic mechanical analysis (DMA) yields information about the mechanical properties of a specimen placed in minor, usually sinusoidal, oscillation of a function of time and temperature by subjecting it to a small, usually sinusoidal, oscillating force. In order to measure the Tg value of the cast elastomer, storage modulus (G') and loss modulus (G") are first determined. The storage modulus (G') represents the stiffness of the polymer material and is proportional to the energy stored during a loading cycle. The loss modulus (G") is defined as being proportional to the energy dissipated during one loading cycle. It represents, for example, energy lost as heat, and is a measure of vibrational energy that has been converted during vibration and that cannot be recovered. Next, phase angle delta (δ) is measured which is the phase difference between dynamic stress and dynamic strain in the cast elastomer subjected to a sinusoidal oscillation. Loss factor tan delta is the ratio of loss modulus (G') to storage modulus (G"). It is a measure of the energy lost, expressed in terms of the recoverable energy, and represents mechanical damping or internal friction in the cast elastomer. A high tan delta value is indicative of a material that has a high, non-elastic strain component, while a low value indicates one that is more elastic. Often, the Tg value is taken to be the temperature of the maximum loss modulus (G"max) or the maximum loss factor (max tan delta), as shown in the examples described hereinbelow. DMA experiments may be conducted using any commercially available instruments, such as but not limited to, Discovery HR-2 by TA Instruments.

In another aspect of the present invention, an isocyanate prepolymer obtained by the process as described hereinabove has an NCO content in the range of 2 wt.-% to 50 wt.-%. The said isocyanate prepolymer may be obtained by any of the embodiments already described hereinabove.

In a further aspect of the present invention, use of the cast elastomer as described hereinabove or as obtained by the process described hereinabove, in an article is disclosed. The person skilled in the art is well aware of such techniques and the process conditions thereof do not limit the present invention and the person skilled in the art can make such selection.

For the purpose of the present invention, the said article is selected from the group consisting of, such as but not limited to, rollers, castor, wheels, millable casting, belts, cast, sheet, track, seals, gaskets, scraper blades, screens, sieves, tubing, sprockets, gears, couplings, coatings, mold forms and adhesives.

In yet another aspect of the present invention, an article comprising the cast elastomer as described hereinabove or as obtained by the process described hereinabove or the use described hereinabove, is further disclosed.

FIGS. 1A-C and 2A-C are atomic-force microscope (AFM) images of cast elastomer showing hard block content. AFM, sometimes referred to as scanning force microscope (SFM), is a very-high-magnification type of scanning probe microscope with demonstrated magnification on the order of fractions of a nanometer.

Figure 1B:
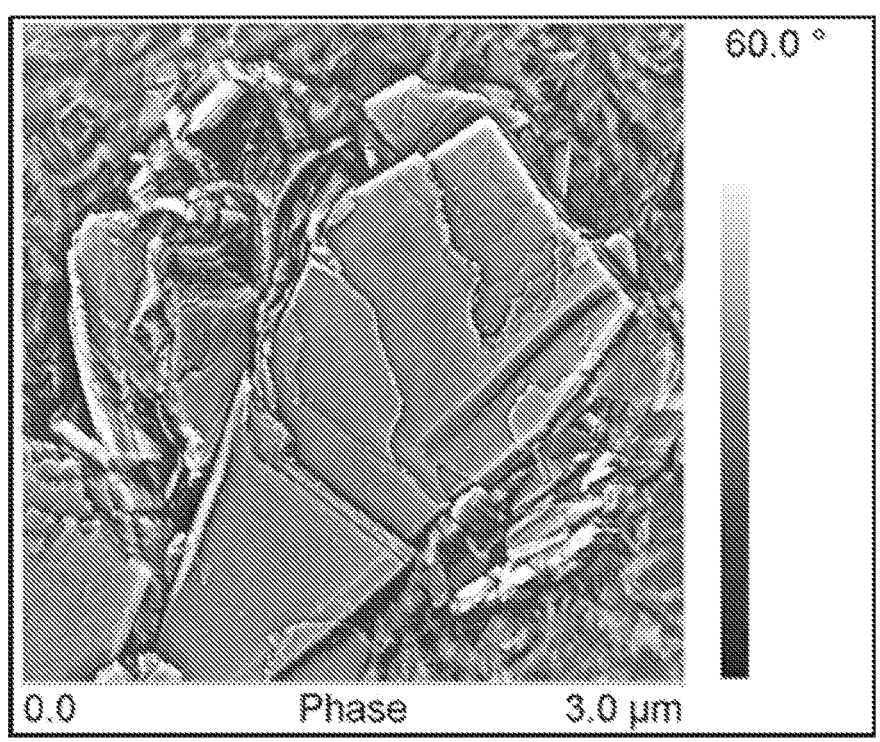
FIG. 1B is a second, higher magnification AFM image of the cast elastomer of FIG. 1A.
Figure 1C:
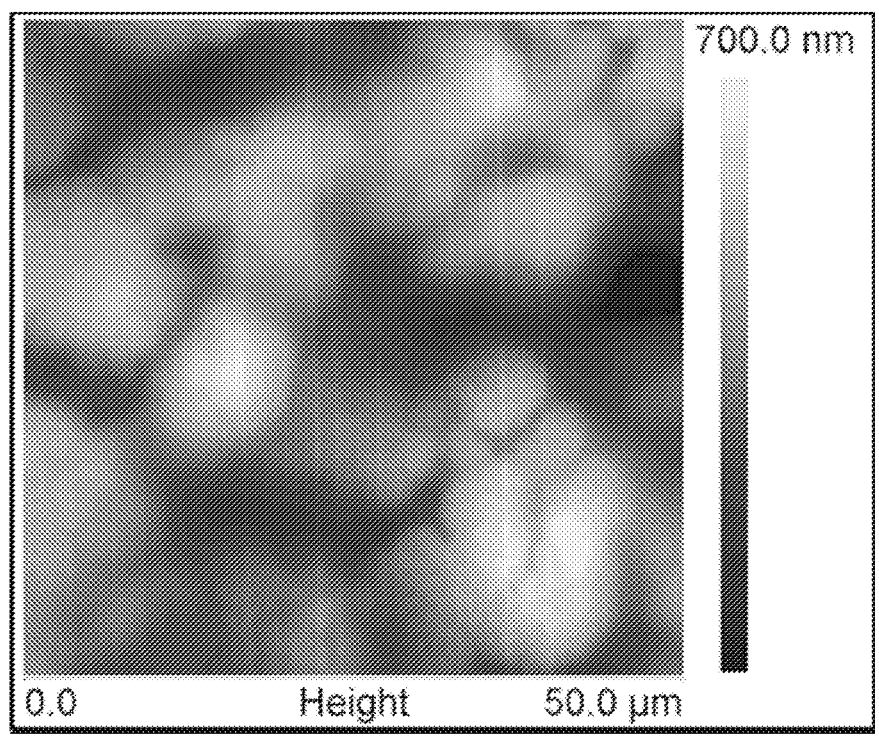
FIG. 1C is an AFM image of a cast elastomer which is not formed with an isocyanate prepolymer comprising graphene nano platelets for comparison with the AFM image of FIG. 1A.

Referring now to FIG. 1A, an atomic-force microscope (AFM) image of a cast elastomer formed with an isocyanate prepolymer comprising GNP and polytetrahydrofuran. The GNP is characterized by its white color and the hard block morphology, which is organized around the GNP, is characterized by its lighter color. The soft segment content is characterized by the darkest color. FIG. 1B is a second, higher magnification AFM image of the cast elastomer of FIG. 1A. FIG. 1C is an AFM image of a comparable cast elastomer. The cast elastomer of FIG. 1C is formed with polytetrahydrofuran, but not formed with an isocyanate prepolymer comprising graphene nano platelets, and is included herein for comparison with the image of FIG. 1A. Notably, the hard block segments of the cast elastomer of FIG. 1C are not as well defined as the hard block segments of the cast elastomer of FIG. 1A. The well-defined hard block segments of the cast elastomer of FIG. 1A are organized around the GNP platelets. The cast elastomer of FIG. 1A is formed in accordance with the subject disclosure and the well-defined hard block content of the cast elastomer of FIG. 1A is believed to impart excellent physical properties on cast elastomer of FIG. 1A.

Figure 2A:
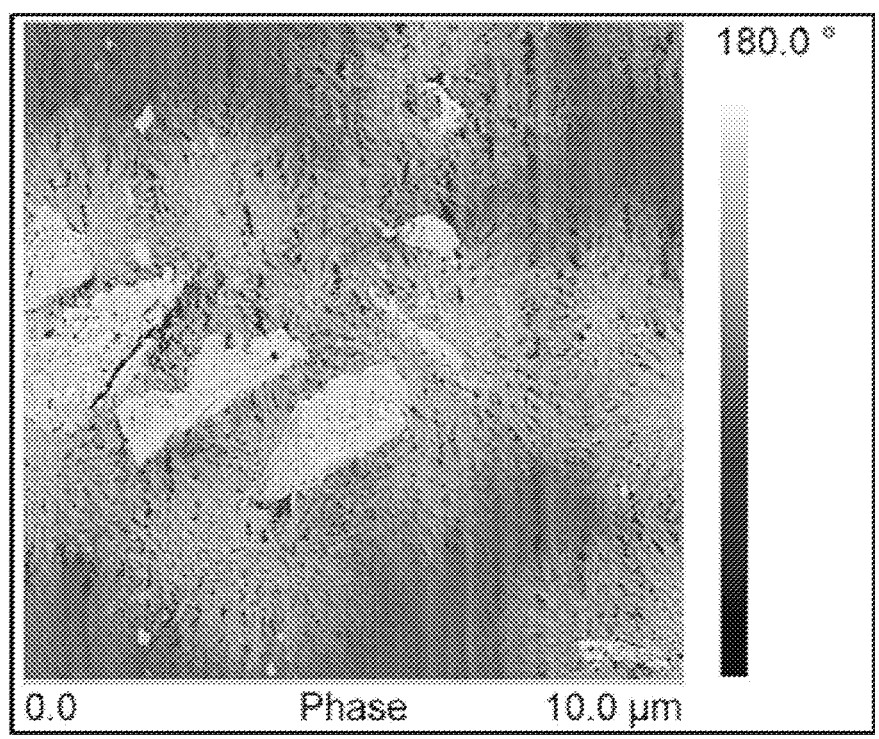
FIG. 2A is an AFM image of a cast elastomer formed with an isocyanate prepolymer comprising graphene nano platelets.
Figure 2B:
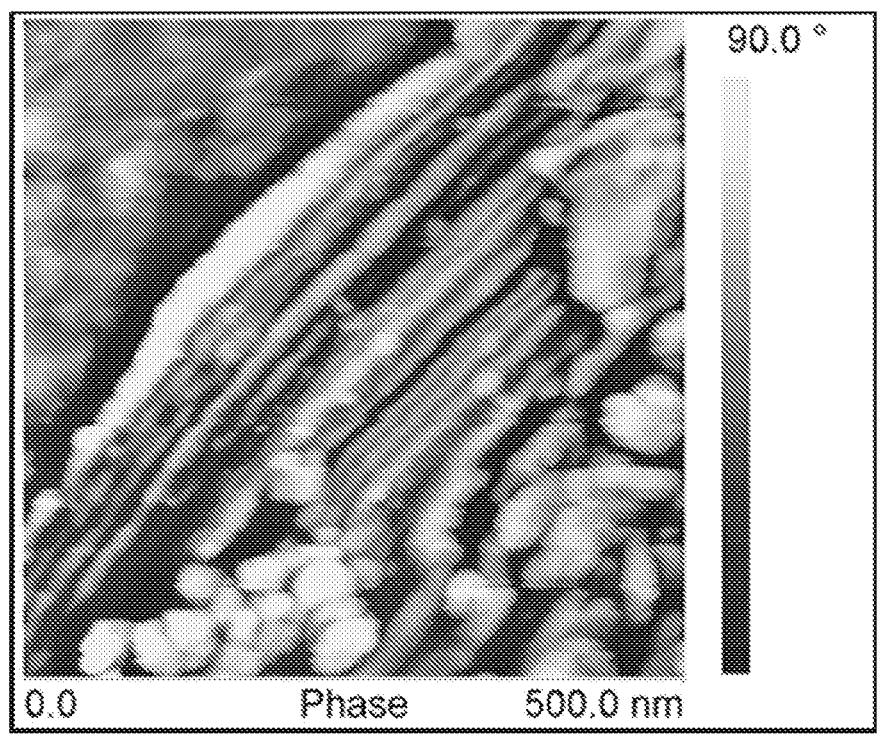
FIG. 2B is a second, higher magnification AFM image of the cast elastomer of FIG. 2A.
Figure 2C:
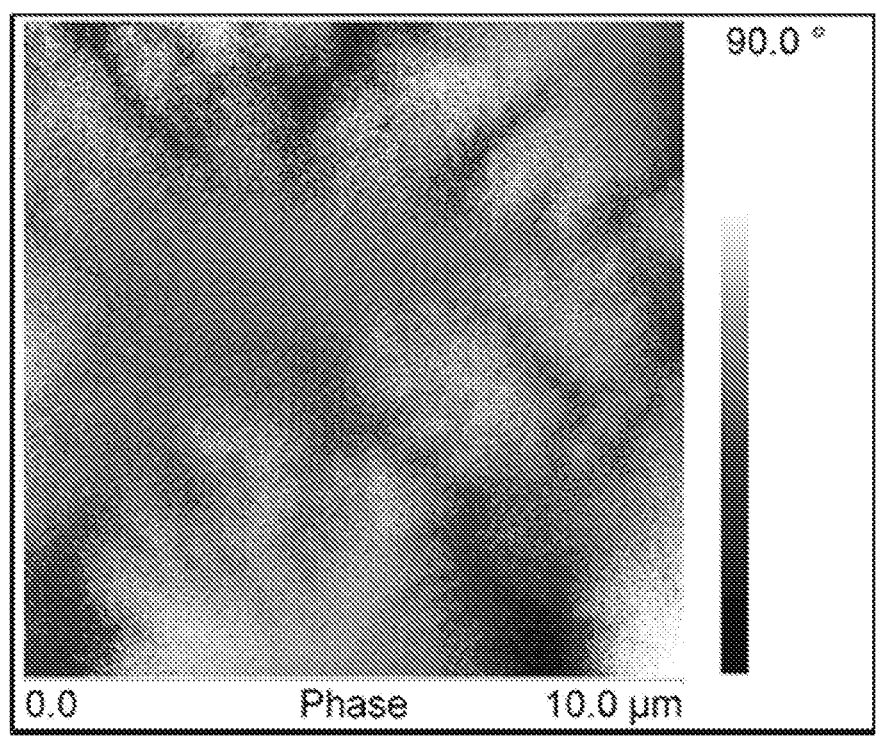
FIG. 2C is an AFM image of a cast elastomer which is not formed with an isocyanate prepolymer comprising graphene nano platelets for comparison with the AFM image of FIG. 2A.

Referring now to FIG. 2A, AFM image of a cast elastomer formed with an isocyanate prepolymer comprising graphene GNP and polyester polyol. The GNP is characterized by its white color and the hard block content, which is organized around the GNP, is characterized by its lighter color. The soft segment content is characterized by the darkest color. FIG. 2B is a second, higher magnification AFM image of the cast elastomer of FIG. 2A. FIG. 2C is an AFM image of a comparable cast elastomer. The polyurethane of FIG. 2C is formed with polyester polyol, but not formed with an isocyanate prepolymer comprising graphene nano platelets, and is included herein for comparison with the image of FIG. 2A. Notably, the hard block segments of the cast elastomer of FIG. 2C are not as well defined as the hard block segments of the cast elastomer of FIG. 2A. The well-defined hard block segments of the cast elastomer of FIG. 2A are organized around the GNP platelets. The cast elastomer of FIG. 2A is formed in accordance with the subject disclosure and the well-defined hard block morphology of the cast elastomer of FIG. 2A is believed to impart excellent physical properties on cast elastomer of FIG. 2A.

The present invention is illustrated in more detail by the following embodiments and combinations of embodiments which result from the corresponding dependency references and links:

1. A cast elastomer comprising the reaction product of:
   (A) 10 wt.-% to 98 wt.-% of at least one isocyanate component,
   (B) 2 wt.-% to 90 wt.-% of at least one polyol component,
   (C) 0.1 wt.-% to 20 wt.-% of graphene nano platelets having an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01 wt.-% to 10 wt.-% based on the total weight of the graphene nano platelets, and
   (D) 1 wt.-% to 30 wt.-% of at least one cross-linker or a chain extender,
   wherein the wt.-% is based on the total weight of the cast elastomer and
   wherein the cast elastomer has a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein
   $m_{CE}$ is the mass of the at least one cross linker or the chain extender in g,
   $EW_{CE}$ is the equivalent weight of the at least one cross linker or the chain extender in g/eq,
   $m_{ICN}$ is the mass of the at least one isocyanate component in g,
   $EW_{ICN}$ is the equivalent weight of the at least one isocyanate component in g/eq,
   n is the number of cross linker or chain extender and the isocyanate.

2. The cast elastomer according to embodiment 1, characterized in that the at least one isocyanate component (A) is present in an amount in the range of 15 wt.-% to 85 wt.-% based on the total weight of the cast elastomer.

3. The cast elastomer according to embodiment 1 or 2, characterized in that the at least one polyol component (B) is present in an amount in the range of 15 wt.-% to 85 wt.-% based on the total weight of the cast elastomer.

4. The cast elastomer according to one or more of embodiments 1 to 3, characterized in that the graphene nano platelets (C) have an average lateral dimension (x, y) in the range of 3 μm to 60 μm determined by atomic force microscope according to ASTM E2859.

5. The cast elastomer according to one or more of embodiments 1 to 4, characterized in that the graphene nano platelets (C) have an average through-plane dimension (z) in the range of 5 nm to 50 nm determined by atomic force microscope according to ASTM E2859.

6. The cast elastomer according to one or more of embodiments 1 to 5, characterized in that the graphene nano platelets (C) are present in an amount in the range of 1 wt.-% to 5 wt.-% based on the total weight of the cast elastomer.

7. The cast elastomer according to one or more of embodiments 1 to 6, characterized in that the at least one isocyanate component (A) is selected from the group consisting of at least one diisocyanate component (A1), at least one polymeric diisocyanate component (A2) and a mixture thereof.

8. The cast elastomer according to embodiment 7, characterized in that the at least one diisocyanate component (A1) has a NCO content in the range of 20 wt.-% to 50 wt.-%.

9. The cast elastomer according to embodiment 8, characterized in that the aromatic diisocyanate (A11) has NCO content in the range of 20 wt.-% to 50 wt.-%.
10. The cast elastomer according to embodiment 7, characterized in that the at least one polymeric diisocyanate component (A2) has NCO content in the range of 15 wt.-% to 35 wt.-%.
11. The cast elastomer according to embodiment 10, characterized in that the at least one polymeric diisocyanate component (A2) has NCO content in the range of 18% to 35%.
12. The cast elastomer according to embodiment 8 or 9, characterized in that the aromatic diisocyanate (A11) is selected from the group consisting of tetramethylxylylene diisocyanate (TMXDI), 1,4-diisocyanatobenzene, 1,3-diisocyanato-oxylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate and combinations thereof.
13. The cast elastomer according to embodiment 12, characterized in that the aromatic diisocyanate (A11) is 4,4'-diphenylmethane diisocyanate.
14. The cast elastomer according to embodiment 7 or 10, characterized in that the polymeric diisocyanate component (A2) is selected from the group consisting of polymeric diphenylmethane diisocyanates and polymeric toluene diisocyanate.
15. The cast elastomer according to embodiment 14, characterized in that the polymeric diisocyanate component (A2) is polymeric diphenylmethane diisocyanate.
16. The cast elastomer according to one or more of embodiments 1 to 15, characterized in that the at least one polyol component (B) has a hydroxyl number in the range of 10 mgKOH/g to 1000 mgKOH/g determined according to ASTM D4274.
17. The cast elastomer according to one or more of embodiments 1 to 16, characterized in that the at least one polyol component (B) has an average functionality in the range of 1 to 8.
18. The cast elastomer according to one or more of embodiments 1 to 17, characterized in that the at least one polyol component (B) is selected from the group consisting of polyether polyol (B1), polyester polyol (B2), natural oil polyol (B3), polydiene polyol (B4), copolymers and combinations thereof.
19. The cast elastomer according to embodiment 18, characterized in that the polyether polyol (B1) is derived from a monomer selected from the group consisting of ethylene oxide, propylene oxide, tetrahydrofuran and a mixture thereof.
20. The cast elastomer according to embodiment 18 or 19, characterized in that the polyether polyol (B1) is derived from tetrahydrofuran.
21. The cast elastomer according to one or more of embodiments 18 to 20, characterized in that the polyether polyol (B1) has a hydroxyl number in the range of 10 mgKOH/g to 1000 mgKOH/g determined according to ASTM D4274.
22. The cast elastomer according to embodiment 18, characterized in that the polyester polyol (B2) is selected from the group consisting of reaction product of polyhydric alcohol, polymerization product of lactone and polymerization product of di-carboxylic acid with polyhydric alcohol.
23. The cast elastomer according to embodiment 22, characterized in that the polyester polyol (B2) is a polymerization product of lactone.
24. The cast elastomer according to embodiment 22 or 23, characterized in that the polymerization product of lactone is a polymerization product of caprolactone.
25. The cast elastomer according to embodiment 24, characterized in that the polymerization product of caprolactone has a hydroxyl number in the range of 30 mgKOH/g to 1000 mgKOH/g determined according to ASTM D4274.
26. The cast elastomer according to embodiment 18, characterized in that the at least one polyol component (B) is a copolymer of the polyether polyol (B1) and the polyester polyol (B2).
27. The cast elastomer according to embodiment 27, characterized in that the copolymer of the polyether polyol (B1) and the polyester polyol (B2) is a block copolymer of the polyether polyol (B1) derived from tetrahydrofuran and the polymerization product of caprolactone.
28. The cast elastomer according to one or more of embodiments 1 to 27, characterized in that the at least one cross-linker or the chain extender (D) is present in an amount in the range of 1 wt.-% to 30 wt.-% based on the total weight of the cast elastomer.
29. The cast elastomer according to one or more of embodiments 1 to 28, characterized in that the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, hydroquinone bis(2-hydroxyethyl)ether (HQEE), bis-(hydroxy-methyl-cyclohexane), hexanediol, thiodiglycol, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine, ethanol amine, aminopropyl alcohol, 2,2-dimethyl propanol amine, 3-aminocyclohexyl alcohol, p-aminobenzyl alcohol, glycerine, trimethylolpropane (TMP), pentaerythritol, dimethylthiotoluenediamine, 3,5-diethyltoluene-2,4-diamine, 3,5-diethyltoluene-2,6-diamine, 2-methyl-1,3-propanediol, 4,4'-methylenebis(2-chloroanaline), 1,3-propanediol, castor oil, tetrahydroxypropylethylenedia-mine, triisopropanolamine, triethanolamine and a mixture thereof.
30. The cast elastomer according to one or more of embodiments 1 to 29, characterized in that the at least one cross-linker or the chain extender (D) has a molecular weight in the range of 50 g/mol to 350 g/mol.
31. The cast elastomer according to one or more of embodiments 1 to 30 further comprising at least one additive (E).
32. The cast elastomer according to one or more of embodiments 1 to 31, characterized in that the graphene nano platelets (C) is present in the form of a powder or in the form of a dispersion.
33. The cast elastomer according to one or more of embodiments 1 to 32 having a Young's modulus of at least 2,500 psi determined according to ASTM D412 and a break at elongation of at least 200% determined according to ASTM D412, yet maintaining elasticity and durability over a temperature in the range of −30° C. to 150° C.

34. A process for preparing a cast elastomer according to one or more of embodiment 1 to 33, comprising the steps of:
(A') preparing an isocyanate prepolymer comprising the at least one isocyanate component (A), the at least one polyol component (B) and the graphene nano platelets (C), wherein the isocyanate prepolymer has an isocyanate index in the range of 1 to 300, and
(B') reacting the isocyanate prepolymer of step (A') with the at least one cross-linker or the chain extender (D) to obtain a cast elastomer having a hard segment content in the range of 50% to 97%, the hard segment content being defined by the formula:

$$\text{Hard segment content} = \{\Sigma_{x=1}^{n}[m_{CE}/EW_{CE}]/[m_{ICN}/EW_{ICN}]\} \times 100\% \{\Sigma_{x=1}^{n}[m_{CE}/EW_{CE}]/[m_{ICN}/EW_{ICN}]\} \times 100\%$$

wherein,
$m_{CE}$ is the mass of the at least one cross linker or the chain extender in g,
$EW_{CE}$ is the equivalent weight of the at least one cross linker or the chain extender in g/eq,
$m_{ICN}$ is the mass of the at least one isocyanate component in g,
$EW_{ICN}$ is the equivalent weight of the at least one isocyanate component in g/eq,
n is the number of cross linker or chain extender and the isocyanate,
wherein the graphene nanoplatelets (C) have an average lateral dimension (x, y) in the range of 1 μm to 100 μm determined by atomic force microscope according to ASTM E2859, an average through-plane dimension (z) in the range of 5 nm to 100 nm determined by atomic force microscope according to ASTM E2859 and an oxygen content in the range of 0.01 wt.-% to 10 wt.-% based on the total weight of the graphene nano platelets (C).

35. The process according to embodiment 34, characterized in that the step (A') is substantially free of any solvent.

36. The process according to embodiment 33, characterized in that in step (A') the isocyanate prepolymer is obtained by:
(A1') mixing the at least one polyol component (B) and the graphene nanoplatelets (C) to obtain an isocyanate reactive mixture,
(A2') adding the isocyanate reactive mixture of step (A1') and the at least one isocyanate component (A) optionally in the presence of the at least one cross-linker or the chain extender (D) to obtain an isocyanate prepolymer having an NCO content in the range of 2 wt.-% to 50 wt.-%.

37. The process according to embodiment 33, characterized in that in step (A') the graphene nano platelets (C) are first mixed with the at least one isocyanate component (A) to obtain a mixture.

38. The process according to embodiment 37 further comprising the step of adding the mixture to the at least one polyol component (B) optionally in the presence of the at least one cross-linker or the chain extender (D) to obtain the isocyanate prepolymer having an NCO content in the range of 2 wt.-% to 50 wt.-%.

39. The process according to embodiment 33, characterized in that the graphene nano platelets (C) are added in step (A') or in step (B') or in both.

40. The process according to one or more of embodiments 33 to 39, characterized in that in step (B') the isocyanate prepolymer is heated to a temperature in the range of 20° C. to 150° C.

41. The process according to one or more of embodiments 33 to 40, characterized in that the graphene nano platelets (C) are present in the form of a powder or in the form of a dispersion.

42. The process according to one or more of embodiments 33 to 41 further comprising the step of:
(C') post curing the cast elastomer of step (B') for a duration in the range of 0.1 h to 24 h at a temperature in the range of 100° C. to 200° C.

43. The process according to one or more of embodiments 33 to 42, characterized in that the step (A') and/or step (B'), independent of one another, takes place in the presence of optionally the at least one additive (E) and/or at least one catalyst (F).

44. The process according to one or more of embodiments 33 to 43, characterized in that the cast elastomer has a Young's modulus of at least 2,500 psi determined according to ASTM D412 and a break at elongation of at least 200% determined according to ASTM D412, yet maintaining elasticity and durability over a temperature in the range of −30° C. to 150° C.

45. The process according to one or more of claims 33 to 44, characterized in that the graphene nano platelets (C) is present in the form of a powder or in the form of a dispersion 46. An isocyanate prepolymer obtained by the process according to one or more of embodiments 33 to 45, characterized in that the isocyanate prepolymer has an NCO content in the range of 2 wt.-% to 50 wt.-%.

47. Use of the cast elastomer according to one or more of embodiments 1 to 33 or as obtained by the process according to one or more of embodiments 33 to 45 in an article.

48. The use according to embodiment 47, characterized in that the article is selected from the group consisting of rollers, castor, wheels, millable casting, belts, cast, sheet, track, seals, gaskets, scraper blades, screens, sieves, tubing, sprockets, gears, couplings, coatings, mold forms and adhesives.

49. An article comprising the cast elastomer according to one or more of embodiments 1 to 33 or as obtained by the process according to one or more of embodiments 33 to 45.

Examples and Comparative Examples

Compounds
Polyol component
    Polyol A Polytetrahydrofuran with Mn=2,000 g/mol
    Polyol B Polytetrahydrofuran with Mn=1,000 g/mol
    Polyol C Polyethylene glycol adipate with Mn=2,000 g/mol
    Polyol D Polyethylene glycol adipate with Mn=1,000 g/mol
    Polyol E Polycaprolactone with Mn=2,000 g/mol
    Polyol F Copolymer of Polycaprolactone & Polytetrahydrofuran with Mn=2,000 g/mol
were obtained from BASF and Perstorp
Isocyanate Component
Isocyanate A 4,4'-diphenylmethane diisocyanate (MDI) having NCO content of 33.5 wt.-%, obtained from BASF.

Graphene Nano Platelets

GNP A Graphene nano platelets having an oxygen content 1% and an average lateral dimension of 10 μm (x, y)

GNP B Graphene nano platelets having an oxygen content 1% and an average lateral dimension of 7 μm (x, y)

GNP C Graphene nano platelets having an oxygen content 3% and an average lateral dimension of 5 μm (x, y)

were obtained from Angstron Materials

Cross-Linker or Chain Extender

Curative A 1,4-butanediol obtained from Sigma Aldrich

Catalyst Tertiary amine comprising a mixture of triethylene diamine and dipropylene glycol obtained from Evonik.

Additive Additive capable of providing acid content of 10 to 1000 ppm obtained from BASF.

Standard Methods

OH number ASTM D4274

Compression set (Cd) ASTM D395

Bayshore resilience ASTM D2632

Shore A hardness ASTM D2240

Split tear ASTM D624

Stress ASTM D412/Die C

Break at elongation ASTM D412/Die C

Peak stress ASTM D412/Die C

Young's modulus ASTM D412/Die C

Tg values in the examples were determined by dynamic mechanical thermal analysis at a heating rate of 3° C./min at 0.3% strain and a frequency of 1 Hz torsion mode using Discovery HR-2 from TA Instruments.

EXAMPLES

Examples 1-3

The isocyanate prepolymers of Examples 1-3 include GNP and are formed in accordance with the subject disclosure. The isocyanate prepolymer of Comparative Example 1 is formed without GNP for comparative purposes. The isocyanate prepolymers of Examples 1-3 have a calculated number average molecular weight (Mn) of approximately 1150 g/mol based on an NCO content of 7.3% by weight. The isocyanate prepolymers of Examples 1-3 are a black, viscous liquid.

The isocyanate prepolymers of Examples 1-3 are reacted with Curative A to form the cast elastomers of Examples 1-3. The isocyanate prepolymer of Comparative Example 1 is also reacted with Curative A to form the cast elastomer of Comparative Example 1. The cast elastomers of Examples 1-3 are formed into molded articles. The amounts of all components used to form Examples 1-3 are set forth in Table 1 below with all amounts in % by weight based on the total weight of the reactants reacted to form the cast elastomers of Examples 1-3.

To form the isocyanate prepolymers of Examples 1-3 and the cast elastomers of Examples 1-3, the GNP is mixed with the pTHF polyol. This mixture is reacted with the MDI in the presence of stabilizing additive and catalyst (at less than 0.5% by weight based on the total weight of the reactants) to produce the prepolymer. The prepolymer is reacted with the curative to produce a cast elastomer.

The composition and properties of the cast elastomer obtained, as described hereinabove, is reported in Table 1 below.

TABLE 1

| Component | Comparative example 1 | Example 1 | Example 2 | Example 3 |
|---|---|---|---|---|
| Isocyanate prepolymer | | | | |
| Isocyanate A | 28.4 wt.-% | 28.73 wt.-% | 28.68 wt.-% | 28.94 wt.-% |
| Polyol A | 64.79 wt.-% | 62.40 wt.-% | 62.46 wt.-% | 62.10 wt.-% |
| GNP A | — | 1.86 wt.-% | — | — |
| GNP B | — | — | 1.86 wt.-% | — |
| GNP C | — | — | — | 1.86 wt.-% |
| Isocyanate prepolymer properties | | | | |
| NCO content (wt.-%) | 7.28 | 7.52 | 7.50 | 7.62 |
| Mol. Wt., Mn (g/mol) | 1154 | 1118 | 1120 | 1102 |
| Cast elastomer | | | | |
| Curative A | 6.80 wt.-% | 7.01 wt.-% | 6.99 wt.-% | 7.10 wt.-% |
| Cast elastomer properties | | | | |
| Hard segment content (%) | 66.51 | 67.88 | 67.83 | 68.24 |
| Comp. Set (Cd) 25% (%) | 6.813 | 9.58 | 11.01 | 20.027 |
| Bayshore resilience (%) | 56.667 | 57.667 | 57 | 58 |
| Shore A | 85.667 | 90 | 89.667 | 87 |
| Split Tear (ppi) | 111.077 | 169.94 | 173.697 | 157.783 |
| Stress at 10% (psi) | 301.9 | 590.96 | 509.66 | 490.24 |
| Stress at 100% (psi) | 849.02 | 1169.8 | 1105.18 | 1095.12 |
| Stress at 200% (psi) | 1201.78 | 1460.96 | 1403.02 | 1401.18 |
| Stress at 50% (psi) | 658.5 | 993.9 | 928.7 | 904.3 |
| Break elongation (%) | 484.4 | 519.66 | 503.78 | 489.54 |
| Peak stress (psi) | 4347.354 | 4576.926 | 4201.384 | 4421.882 |
| Young's modulus (psi) | 3654.26 | 9364.2 | 7371.86 | 7039.64 |
| Tg at max tan δ (° C.) | −51.13 | −52.56 | −53.06 | −49.38 |

Referring now to Table 1, Examples 1-3, which include GNP, exhibit excellent physical properties over Comparative Example 1, which does not include GNP. For example, Bayshore Resilience is maintained over Comparative Example 1, hardness is increased over Comparative Example 1 by up to 4.33 points), tear strength is increased over Comparative Example 1 (by up to 150%), stress at elongation is increased over Comparative Example 1 (from 10-200%), elongation at brake is maintained with the inclusion of GNP and increased cross-linking, peak stress is maintained with the inclusion of graphene nano platelets and increased cross-linking, and Young's modulus is increased over Comparative Example 1 (by up to 256%). As such, Examples 1-3 all exhibit improved properties.

From the perspective of lateral dimension (x, y), Example 1, comprising GNP having an average lateral dimension (x, y) of 10 μm generally exhibits the greatest improvement in modulus with elongation, Young's modulus, and tear, while maintaining ultimate elongation and tensile strength over Comparative Example 1. Example 2 exhibits similar improvements (to a lesser extent than Example 1) in modulus with elongation, Young's modulus, and tear, over Comparative Example 1. Example 3 exhibits similar improvements (to a lesser extent than Example 2) in modulus with elongation, Young's modulus, and tear, over Comparative Example 1. To this end, isocyanate prepolymers including GNP having an average lateral dimension (x, y) range of from about 7 to about 10 μm form cast elastomers having excellent physical properties.

Examples 4-7

The isocyanate prepolymers of Examples 4-7 are formed in accordance with the subject disclosure. The isocyanate prepolymers of Examples 4-7 are a black, viscous liquid.

The isocyanate prepolymers of Examples 4-7 are reacted with Curative A to form the cast elastomers of Examples 4-7. The cast elastomers of Examples 4-7 are formed into black, molded articles. The amounts of all components used to form Examples 4-7 are set forth in Table 2 below with all amounts in % by weight based on the total weight of the reactants reacted to form the cast elastomers of Examples 4-7.

To form the isocyanate prepolymers of Examples 4-7 and the cast elastomers of Examples 4-7, the GNP is mixed with the pTHF polyol. This mixture is reacted with the MDI to produce the prepolymer. The prepolymer is reacted with the curative in the presence of stabilizing and defoaming additives and a curative (at less than 0.5% by weight based on the total weight of the reactants) to produce a cast elastomer.

The composition and properties of the cast elastomer obtained, as described hereinabove, is reported in Table 2 below.

TABLE 2

| Component | Example 4 | Example 5 | Example 6 | Example 7 |
|---|---|---|---|---|
| Isocyanate prepolymer | | | | |
| Isocyanate A | 25.95 wt.-% | 28.40 wt.-% | 31.55 wt.-% | 32.90 wt.-% |
| Polyol A | 66.28 wt.-% | 62.86 wt.-% | 58.83 wt.-% | 30.85 wt.-% |
| Polyol B | — | — | — | 26.74 wt.-% |
| GNP A | 1.88 wt.-% | 1.86 wt.-% | 1.83 wt.-% | 1.85 wt.-% |
| Isocyanate prepolymer properties | | | | |
| NCO content (wt.-%) | 6.27 | 7.37 | 8.87 | 8.10 |
| Mol. Wt., Mn (g/mol) | 1340 | 1140 | 947 | 1037 |
| Cast elastomer | | | | |
| Curative A | 5.89 | 6.88 | 8.49 | 7.68 |
| Cast elastomer properties | | | | |
| Hard segment content (%) | 63.07 | 67.38 | 74.85 | 64.94 |
| Comp. Set (Cd) 25% (%) | 17.243 | 17.974 | 21.603 | 42.433 |
| Bayshore resilience (%) | 62.133 | 62.20 | 60.733 | 56.667 |
| Shore A | 90.333 | 93 | 94.333 | 91.667 |
| Split Tear (ppi) | 129.237 | 150.667 | 176.33 | 223.833 |
| Stress at 50% (psi) | 886.983 | 1137.267 | 1521.867 | 1274.783 |
| Stress at 100% (psi) | 1059.783 | 1308.6 | 1682.817 | 1397.35 |
| Stress at 200% (psi) | 1356.683 | 1600.867 | 1976 | 1582.133 |
| Stress at 300% (psi) | 1761.267 | 1998.05 | 2450.45 | 1812.483 |
| Tensile modulus (psi) | 6921 | 10879.567 | 20117.5 | 13795.617 |
| Break elongation (%) | 463.433 | 480.717 | 445.533 | 591.65 |
| Peak stress (psi) | 3606.415 | 4025.285 | 4244.762 | 2846.15 |
| Tg at max tan δ (° C.) | −56.14 | −56.84 | −56.37 | −46.81 |

Referring now to Table 2, the use of the Isocyanate Prepolymers of Examples 4-7 yields the cast elastomers of Examples 4-7 which demonstrate improved physical properties with increased hard block content. That is, cast elastomers formed with the Isocyanate Prepolymers of Examples 4-7 achieved improvement in Young's modulus which increases significantly in the presence of graphene with each increase in molar percent hard block. Further, the cast elastomers of Examples 4-7 exhibit significant improvements in modulus with elongation, and tear is also established while maintaining ultimate elongation and tensile strength.

Referring now to FIG. 3, the loss modulus, storage modulus, and tangent delta (tan δ) of Examples 5-7 are determined via dynamic mechanical thermal analysis (DMTA). The tan δ is the ratio of the loss modulus to the storage modulus. The cast elastomers of Examples 5-7, which include the isocyanate prepolymer comprising GNP, demonstrate an increase in modulus with increasing hard block content. Further, FIG. 3 shows that the cast elastomers of Examples 5-7, which include the isocyanate prepolymer comprising GNP, exhibit a glass transition temperature (Tg) and have a stable rubbery plateau. Still referring to FIG. 3, the modulus of the rubbery plateau and the onset to melt increases with each increase in % molar hard block over a range of −45° C. to >150° C. for Examples 5-7.

Examples 8-10

The isocyanate prepolymers of Examples 8-10 are formed in accordance with the subject disclosure. The isocyanate prepolymer of Comparative Example 2 is formed without GNP for comparative purposes. The isocyanate prepolymers of Examples 8-10 are a black, viscous liquid.

The isocyanate prepolymers of Examples 8-10 are reacted with Curative A to form the cast elastomers of Examples 8-10. The isocyanate prepolymer of Comparative Example 2 is also reacted with Curative A to form the cast elastomer of Comparative Example 2. The cast elastomers of Examples 8-10 are formed into black, molded articles. The amounts of all components used to form Examples 8-10 are set forth in Table 3 below with all amounts in % by weight based on the total weight of the reactants reacted to form the cast elastomers of Examples 8-10.

To form the isocyanate prepolymers of Examples 8-10 and the cast elastomers of Examples 8-10, the GNP is mixed with the polyethylene glycol adipate polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer.

The composition and properties of the cast elastomer obtained, as described hereinabove, is reported in Table 3 below.

TABLE 3

| Component | Comparative example 2 | Example 8 | Example 9 | Example 10 |
|---|---|---|---|---|
| Isocyanate prepolymer | | | | |
| Isocyanate A | 27.05 wt.-% | 27.11 wt.-% | 28.11 wt.-% | 27.04 wt.-% |
| Polyol C | 66.51 wt.-% | 64.47 wt.-% | 64.47 wt.-% | 64.57 wt.-% |
| GNP A | — | 1.87 wt.-% | — | — |
| GNP B | — | — | 1.87 wt.-% | — |
| GNP C | — | — | — | 1.87 wt.-% |

TABLE 3-continued

| Component | Comparative example 2 | Example 8 | Example 9 | Example 10 |
|---|---|---|---|---|
| Isocyanate prepolymer properties | | | | |
| NCO content (wt.-%) | 6.69 | 6.81 | 6.81 | 6.78 |
| Mol. Wt., Mn (g/mol) | 1270 | 1234 | 1234 | 1240 |
| Cast elastomer | | | | |
| Curative A | 6.44 wt.-% | 6.55 wt.-% | 6.55 wt.-% | 6.52 wt.-% |
| Cast elastomer properties | | | | |
| Hard segment content (%) | 65.86 | 67.14 | 67.14 | 67.04 |
| Comp. Set (Cd) 25% (%) | 14.833 | 15.917 | 22.463 | 18.810 |
| Bayshore resilience (%) | 34.00 | 36.667 | 37.667 | 36.667 |
| Shore A | 80.667 | 87 | 86.667 | 86.667 |
| Split Tear (ppi) | 282.220 | 344.873 | 354.863 | 360.920 |
| Stress at 10% (psi) | 237.30 | 459.24 | 462.78 | 434.08 |
| Stress at 100% (psi) | 737.62 | 1038.78 | 1028.18 | 1026.16 |
| Stress at 200% (psi) | 1058.86 | 1353.58 | 1354.14 | 1343.10 |
| Stress at 50% (psi) | 566.52 | 859.84 | 852.40 | 841.42 |
| Break elongation (%) | 586.98 | 589.32 | 603.78 | 598.80 |
| Peak stress (psi) | 6144.192 | 6194.92 | 6160.812 | 5952.288 |
| Young's modulus (psi) | 2729.74 | 6945.02 | 7218.82 | 6450.44 |
| Tg at max tan δ (° C.) | −13.55 | −19.16 | −19.68 | −18.53 |

Referring now to Table 3, Examples 8-10, which include GNP, exhibit excellent physical properties over Comparative Example 2, which does not include GNP. For example, Bayshore Resilience is maintained over Comparative Example 2, hardness is increased over Comparative Example 2 by up to 6.33 points), tear strength is increased over Comparative Example 2 (by up to 120%), stress at elongation is increased over Comparative Example 2 (from 10-200%), elongation at brake is maintained with the inclusion of GNP and increased cross-linking, peak stress is maintained with the inclusion of GNP and increased cross-linking, and Young's modulus is increased over Comparative Example 1 (by up to 254%). As such, the cast elastomers of Examples 8-10, which are formed with the isocyanate prepolymer comprising GNP, exhibit improvements in modulus with elongation, Young's modulus, and tear while maintaining ultimate elongation and tensile strength.

Referring now to FIG. 4, the loss modulus, storage modulus, and tangent delta (tan δ) of Examples 8-10 are determined via dynamic mechanical thermal analysis (DMTA). The tan δ is the ratio of the loss modulus to the storage modulus. Examples 8-10, which include GNP, demonstrate an increase in modulus with increasing hard block content. Further, FIG. 4 shows that the cast elastomers of Examples 8-10, which include the isocyanate prepolymer comprising GNP, exhibit a glass transition temperature (Tg) and have a stable rubbery plateau. Still referring to FIG. 4, the modulus of the rubbery plateau and the onset to melt increases with each increase in % molar hard block over a range of −45° C. to >150° C. for Examples 8-10.

Examples 11-14

The isocyanate prepolymers of Examples 11-14 are formed in accordance with the subject disclosure. The isocyanate prepolymer of Comparative Example 3 is formed without GNP for comparative purposes. The isocyanate prepolymers of Examples 11-14 are a black, viscous liquid.

The isocyanate prepolymers of Examples 11-14 are reacted with Curative A to form the cast elastomers of Examples 11-14. The isocyanate prepolymer of Comparative Example 3 is also reacted with Curative A to form the cast elastomer of Comparative Example 3. The cast elastomers of Examples 11-14 are formed into black, molded articles. The amounts of all components used to form Examples 11-14 are set forth in Table 4 below with all amounts in % by weight based on the total weight of the reactants reacted to form the cast elastomers of Examples 11-14.

To form the isocyanate prepolymers of Examples 11-14 and the cast elastomers of Examples 11-14, the GNP is mixed with the polyester polyol. This mixture is reacted with the MDI to produce the prepolymer. The prepolymer is reacted with the curative in the presence of stabilizing and defoaming additives and a catalyst (at less than 0.5% by weight based on the total weight of the reactants) a cast elastomer.

The composition and properties of the cast elastomer obtained, as described hereinabove, is reported in Table 4 below.

TABLE 4

| Component | Comparative example 3 | Example 11 | Example 12 | Example 13 | Example 14 |
|---|---|---|---|---|---|
| Isocyanate prepolymer | | | | | |
| Isocyanate A | 26.90 wt.-% | 26.60 wt.-% | 33.08 wt.-% | 35.57 wt.-% | 33.50 wt.-% |
| Polyol C | 66.73 wt.-% | 65.19 wt.-% | 56.09 wt.-% | 52.60 wt.-% | 30.36 wt.-% |
| Polyol D | — | — | — | — | 26.33 wt.-% |
| GNP A | — | 1.87 wt.-% | 1.82 wt.-% | 1.80 wt.-% | 1.87 wt.-% |
| Isocyanate prepolymer properties | | | | | |
| NCO content (wt.-%) | 6.62 | 6.58 | 9.58 | 10.78 | 8.40 |
| Mol. Wt., Mn (g/mol) | 1270 | 1277 | 877 | 780 | 957 |
| Cast elastomer | | | | | |
| Curative A | 6.38 wt.-% | 6.34 wt.-% | 9.01 wt.-% | 10.03 wt.-% | 7.95 wt.-% |
| Cast elastomer properties | | | | | |
| Hard segment content (%) | 65.86 | 66.25 | 75.74 | 78.43 | 66.01 |

TABLE 4-continued

| Component | Comparative example 3 | Example 11 | Example 12 | Example 13 | Example 14 |
|---|---|---|---|---|---|
| Comp. Set (Cd) 25% (%) | 44.77 | 31.78 | 27.797 | 31.437 | 35.08 |
| Bayshore resilience (%) | 25.667 | 37.00 | 40.067 | 44.00 | 31.60 |
| Shore A | 78.333 | 82.333 | 84.667 | 84.00 | 83.00 |
| Split Tear (ppi) | 333.653 | 380.093 | 592.553 | 637.943 | 547.973 |
| Stress at 10% (psi) | 666.833 | 929.217 | 1622.24 | 1963.067 | 1469.917 |
| Stress at 100% (psi) | 835.167 | 1102.40 | 1789.28 | 2074.767 | 1637.70 |
| Stress at 200% (psi) | 1188.783 | 1428.833 | 2116.68 | 2290.15 | 1917.367 |
| Stress at 50% (psi) | 1844.067 | 1909.417 | 26210.06 | 2621.617 | 2322.65 |
| Break elongation (%) | 617.717 | 616.217 | 791.48 | 532.60 | 586.917 |
| Peak stress (psi) | 6310.455 | 5964.368 | 4948.86 | 3924.878 | 5717.00 |
| Young's modulus (psi) | 3655.50 | 8123.533 | 20242.72 | 28173.05 | 14316.23 |
| Tg at max tan δ (° C.) | −20.38 | −20.26 | −17.98 | −20.30 | −14.19 |

Referring now to Table 4, the use of the Isocyanate Prepolymers of Examples 11-14 yields the cast elastomers of Examples 11-14 which demonstrate improved physical properties with increased hard block content. That is, Young's modulus increases significantly in the presence of GNP with each increase in molar percent hard block with respect to the cast elastomers of Examples 11-14, which are formed with the isocyanate prepolymer comprising GNP. Further, the cast elastomers of Examples 11-14, which are formed with the isocyanate prepolymer comprising GNP, exhibit excellent modulus with elongation and tear while maintaining elongation and tensile strength.

Example 15

The isocyanate prepolymer of Example 15 is formed in accordance with the subject disclosure. The isocyanate prepolymer of Comparative Example 4 is formed without GNP for comparative purposes. The isocyanate prepolymer of Example 15 is a black, viscous liquid.

The isocyanate prepolymer of Example 15 is reacted with Curative A to form the cast elastomer of Example 15. The isocyanate prepolymer of Comparative Example 4 is also reacted with Curative A to form the cast elastomer of Comparative Example 4. The cast elastomer of Example 15 is formed into black, molded articles. The amounts of all components used to form Example 15 are set forth in Table 4 below with all amounts in % by weight based on the total weight of the reactants reacted to form the cast elastomers of Example 15.

To form the isocyanate prepolymers of Example 15 and the cast elastomer of Examples 15, the GNP is mixed with the polycaprolactone polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer.

The composition and properties of the cast elastomer obtained, as described hereinabove, is reported in Table 5 below.

TABLE 5

| Component | Comparative example 4 | Example 15 |
|---|---|---|
| Isocyanate prepolymer | | |
| Isocyanate A | 27.80 wt.-% | 27.47 wt.-% |
| Polyol E | 65.45 wt.-% | 64.16 wt.-% |
| GNP A | — | 1.87 wt.-% |
| Isocyanate prepolymer properties | | |
| NCO content (wt.-%) | 7.03 | 6.95 |
| Mol. Wt., Mn (g/mol) | 1195 | 1209 |
| Cast elastomer | | |
| Curative A | 6.75 | 6.50 |
| Cast elastomer properties | | |
| Hard segment content (%) | 67.48 | 65.80 |
| Shore A | 85 | 95 |
| Split Tear (ppi) | 153.40 | 168.00 |
| Stress at 10% (psi) | 352.00 | 463.00 |
| Stress at 100% (psi) | 860.00 | 1094.00 |
| Stress at 200% (psi) | 1293.00 | 1406.00 |
| Stress at 50% (psi) | 683.00 | 917.00 |
| Break elongation (%) | 412.00 | 462.00 |
| Peak stress (psi) | 5465.00 | 5232.00 |
| Young's modulus (psi) | 4447.00 | 8053.00 |
| Tg at max tan δ (° C.) | −32.27 | −32.98 |

Referring now to Table 5, the use of the Isocyanate Prepolymer of Example 15 produced the cast elastomer of Example 15 which demonstrates improved physical properties over the cast elastomer of Comparative Example 4.

Examples 16 and 17

The isocyanate prepolymers of Examples 16 and 17 are formed in accordance with the subject disclosure. The isocyanate prepolymers of Comparative Examples 4 and 5 are formed without GNP for comparative purposes. The isocyanate prepolymers of Examples 16 and 17 are a black, viscous liquid.

The isocyanate prepolymers of Examples 16 and 17 are reacted with Curative A to form the cast elastomers of Examples 16 and 17. The isocyanate prepolymers of Comparative Examples 4 and 5 are also reacted with Curative A to form the cast elastomer of Comparative Example 5. The cast elastomers of Examples 16 and 17 are formed into black, molded articles. The amounts of all components used to form Examples 16 and 17 are set forth in Table 6 below with all amounts in % by weight based on the total weight of the reactants reacted to form the cast elastomers of Examples 16 and 17.

To form the isocyanate prepolymers of Examples 16 and 17 and the cast elastomers of Examples 16 and 17, the GNP is mixed with the polycaprolactone-polyTHF copolymer polyol. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer.

The composition and properties of the cast elastomer obtained, as described hereinabove, is reported in Table 6 below.

TABLE 6

| Component | Comparative example 5 | Comparative example 6 | Example 16 | Example 17 |
|---|---|---|---|---|
| Isocyanate prepolymer | | | | |
| Isocyanate A | 29.72 wt.-% | 31.94 wt.-% | 29.47 wt.-% | 32.85 wt.-% |
| Polyol F | 62.95 wt.-% | 59.83 wt.-% | 61.36 wt.-% | 56.42 wt.-% |
| GNP A | — | — | 1.85 wt.-% | 1.82 wt.-% |
| Isocyanate prepolymer properties | | | | |
| NCO content (wt.-%) | 7.88 | 8.91 | 7.86 | 9.47 |
| Mol. Wt., Mn (g/mol) | 1064 | 944 | 1063 | 885 |
| Cast elastomer | | | | |
| Curative A | 7.33 wt.-% | 8.23 wt.-% | 7.32 wt.-% | 8.91 wt.-% |
| Cast elastomer properties | | | | |
| Hard segment content (%) | 68.62 | 71.67 | 69.03 | 75.48 |
| Comp. Set (Cd) 25% (%) | — | — | 26.00 | 27.00 |
| Bayshore resilience (%) | — | — | 60.00 | 59.00 |
| Shore A | 85 | 87 | 96 | 97 |
| Split Tear (ppi) | 140.00 | 188.00 | 194.00 | 313.00 |
| Stress at 10% (psi) | 355.00 | 586.00 | 860.00 | 1288.00 |
| Stress at 100% (psi) | 941.00 | 1308.00 | 1459.00 | 1839.00 |
| Stress at 200% (psi) | 1345.00 | 1724.00 | 1712.00 | 2049.00 |
| Stress at 50% (psi) | 739.00 | 1083.00 | 1321.00 | 1738.00 |
| Break elongation (%) | 442.00 | 447.00 | 479.00 | 480.00 |
| Peak stress (psi) | 5080.00 | 4849.00 | 4804.00 | 4994.00 |
| Young's modulus (psi) | 4463.00 | 7460.00 | 13942.00 | 23242.00 |
| Tg at max tan δ (° C.) | −40.85 | −40.35 | −43.16 | −44.31 |

Referring now to Table 6, the use of the Isocyanate Prepolymers of Examples 16 and 17 produce the cast elastomers of Examples 16 and 17 which demonstrate improved physical properties over the cast elastomers of Comparative Examples 5 and 6. That is, Young's modulus increases significantly in the presence of GNP with each increase in molar percent hard block with respect to the cast elastomers of Examples 16 and 17, which are formed with the isocyanate prepolymer comprising GNP. Further, the cast elastomers of Examples 16 and 17, which are formed with the isocyanate prepolymer comprising GNP, exhibit excellent modulus with elongation and tear while maintaining elongation and tensile strength.

Examples 18-21

The isocyanate prepolymers of Examples 18-21 are formed in accordance with the subject disclosure. The isocyanate prepolymers of Examples 18-21 are a black, viscous liquid.

The isocyanate prepolymers of Examples 18-21 are reacted with Curative A to form the cast elastomers of Examples 18-21. The cast elastomers of Examples 18-21 are formed into black, molded articles. The amounts of all components used to form Examples 18-21 are set forth in Table 7 below with all amounts in % by weight based on the total weight of the reactants reacted to form the cast elastomers of Examples 18-21.

To form the isocyanate prepolymers of Examples 18-21 and the cast elastomers of Examples 16 and 17, the GNP is mixed with the polyTHF. This mixture is reacted with the MDI to produce the prepolymer. The prepolymer is reacted with the curative in the presence of stabilizing and defoaming additives and a catalyst (at less than 0.5% by weight based on the total weight of the reactants) to produce a cast elastomer.

The composition and properties of the cast elastomer obtained, as described hereinabove, is reported in Table 7 below.

TABLE 7

| Component | Example 18 | Example 19 | Example 20 | Example 21 |
|---|---|---|---|---|
| Isocyanate prepolymer | | | | |
| Isocyanate A | 31.61 wt.-% | 31.86 wt.-% | 41.13 wt.-% | 40.62 wt.-% |
| Polyol A | 59.01 wt.-% | 57.80 wt.-% | — | — |
| Polyol B | — | — | 47.92 wt.-% | 44.72 wt.-% |
| GNP A | 0.92 wt.-% | 1.83 wt.-% | 0.90 wt.-% | 4.5 wt.-% |
| Isocyanate prepolymer properties | | | | |
| NCO content (wt.-%) | 8.85 | 9.02 | 10.85 | 10.97 |
| Mol. Wt., Mw (g/mol) | 950 | 932 | 775 | 766 |
| Cast elastomer | | | | |
| Curative A | 8.47 wt.-% | 8.63 wt.-% | 10.05 wt.-% | 10.16 wt.-% |
| Cast elastomer properties | | | | |
| Hard segment content (%) | 74.54 | 75.25 | 67.91 | 69.52 |

TABLE 7-continued

| Component | Example 18 | Example 19 | Example 20 | Example 21 |
|---|---|---|---|---|
| Comp. Set (Cd) 25% (%) | 22.85 | 21.85 | 29.67 | 34.23 |
| Bayshore resilience (%) | 60.20 | 58 | 40 | 43 |
| Shore A | 90 | 91 | 93 | 94 |
| Split Tear (ppi) | 208 | 224 | 298 | 346 |
| Stress at 50% (psi) | 1266 | 1521 | 2053 | 2298 |
| Stress at 100% (psi) | 1455 | 1521 | 2053 | 2298 |
| Stress at 200% (psi) | 1778 | 1937 | 2773 | 2845 |
| Stress at 300% (psi) | 2213 | 2355 | 3785 | 3722 |
| Break elongation (%) | 490 | 482 | 395 | 357 |
| Peak stress (psi) | 4804 | 4695 | 5539 | 4591 |
| Young's modulus (psi) | 13236 | 21138 | 24236 | 32161 |
| Tg at max tan δ (° C.) | −52.97 | −58.77 | −23.97 | −20.79 |

Referring now to Table 7, the use of the Isocyanate Prepolymers of Examples 16 and 17 produce the cast elastomers of Examples 18-21 which demonstrate improved physical properties. That is, Young's modulus increases significantly in the presence of GNP with each increase in molar percent hard block with respect to the cast elastomers of Examples 18-21, which are formed with the isocyanate prepolymer comprising GNP. Further, the cast elastomers of Examples 18-21, which are formed with the isocyanate prepolymer comprising GNP, exhibit excellent modulus with elongation and tear while maintaining elongation and tensile strength. To this end, urethane elastomers comprising from about 0.9 to about 4.5% by weight GNP, based on the total weight of the urethane elastomer, form cast elastomers having excellent physical properties.

The invention claimed is:

1. A cast elastomer comprising a reaction product of:
(A) 19 wt.-% to 98 wt.-% of at least one isocyanate component,
(B) 2 wt.-% to 80 wt.-% of at least one polyol component,
(C) 0.1 wt.-% to 6 wt.-% of graphene nano platelets having an oxygen content in a range of 0.01 wt.-% to 10 wt.-% based on a total weight of the graphene nano platelets, and
(D) 4 wt.-% to 30 wt.-% of at least one cross-linker or a chain extender,
wherein the wt.-% is based on a total weight of the cast elastomer and
wherein the cast elastomer has a hard segment content in a range of 50% to 97%, the hard segment content being defined by a formula:

Hard segment content=$\{\Sigma_{x=1}^{n}[m_{CE}/EW_{CE}]/[m_{ICN}/EW_{ICN}]\} \times 100\%$ wherein,
$m_{CE}$ is a mass of the at least one cross linker or the chain extender in g,
$EW_{CE}$ is an equivalent weight of the at least one cross linker or the chain extender in g/eq,
$m_{ICN}$ is a mass of the at least one isocyanate component in g,
$EW_{ICN}$ is an equivalent weight of the at least one isocyanate component in g/eq, and
n is a number of cross linker or chain extender and the isocyanate.

2. The cast elastomer according to claim 1, characterized in that the at least one isocyanate component (A) is selected from the group consisting of at least one diisocyanate component (A1), at least one polymeric diisocyanate component (A2) and a mixture thereof.

3. The cast elastomer according to claim 2, characterized in that the at least one diisocyanate component (A1) comprises an aromatic diisocyanate (A11) having NCO content in a range of 2 wt.-% to 50 wt.-%.

4. The cast elastomer according to claim 3, characterized in that the aromatic diisocyanate (A11) is selected from the group consisting of tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, 1,5-naphthalene diisocyanate, 1-methoxy-2,4-phenylene diisocyanate, 2,2'-diphenylmethane diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate and combinations thereof.

5. The cast elastomer according to claim 2, characterized in that the at least one polymeric diisocyanate component (A2) has NCO content in a range of 15 wt.-% to 35 wt.-%.

6. The cast elastomer according to claim 1, characterized in that the at least one isocyanate component (A) is present in an amount in a range of 19 wt.-% to 68 wt.-% based on a total weight of the cast elastomer.

7. The cast elastomer according to claim 1, characterized in that the at least one polyol component (B) has a hydroxyl number in a range of 10 mgKOH/g to 1000 mgKOH/g.

8. The cast elastomer according to claim 1, characterized in that the at least one polyol component (B) is selected from the group consisting of polyether polyol (B1), polyester polyol (B2), natural oil polyol (B3), polydiene polyol (B4), copolymers and combinations thereof.

9. The cast elastomer according to claim 1, characterized in that the at least one polyol component (B) is present in an amount in a range of 15 wt.-% to 80 wt.-% based on the total weight of the cast elastomer.

10. The cast elastomer according to claim 1, characterized in that the at least one cross-linker or the chain extender (D) is selected from the group consisting of ethylene glycol, propylene glycol, butylene glycol, 1,4-butanediol (BDO), 1,3-butanediol, butenediol, butynediol, xylylene glycol, amylene glycol, dipropylene glycol, diethylene glycol, unsubstituted, linear or branched C6 to C12 diols, 1,4-phenylene-bis-beta-hydroxy ethyl ether, 1,3-phenylenebis-beta-hydroxy ethyl ether, hydroquinone bis(2-hydroxyethyl) ether (HQEE), bis-(hydroxy-methyl-cyclohexane), hexanediol, thiodiglycol, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine, ethanol amine, aminopropyl alcohol, 2,2-dimethyl propanol amine, 3-aminocyclohexyl alcohol, p-aminobenzyl alcohol, glycerine, trimethylolpropane (TMP), pentaerythritol, dimethylthiotoluenediamine, 3,5-diethyltoluene-2,4-diamine, 3,5-diethyltoluene-2,6-diamine, 2-methyl-1,3-propanediol, 4,4'-methylenebis(2-chloroanaline), 1,3-propanediol, castor oil, tetrahydroxypropylethylenediamine, triisopropanolamine, triethanolamine and a mixture thereof.

11. The cast elastomer according to claim 1, characterized in that the at least one cross-linker or the chain extender (D) is present in an amount in a range of 4 wt.-% to 18 wt.-% based on a total weight of the cast elastomer.

12. A process for preparing a cast elastomer according to claim 1, comprising the steps of:
- (A') preparing an isocyanate prepolymer comprising the at least one isocyanate component (A), the at least one polyol component (B) and the graphene nano platelets (C),
  wherein the isocyanate prepolymer has an isocyanate index in a range of 1 to 300, and
- (B') reacting the isocyanate prepolymer of step (A') with the at least one cross-linker or the chain extender (D) to obtain a cast elastomer having a hard segment content in a range of 50% to 97%, the hard segment content being defined by a formula:

$$\text{Hard segment content} = \{\Sigma_{x=1}^{n}[m_{CE}/EW_{CE}]/[m_{ICN}/EW_{ICN}]\} \times 100\%$$

wherein, $m_{CE}$ is a mass of the at least one cross linker or the chain extender in g, $EW_{CE}$ is an equivalent weight of the at least one cross linker or the chain extender in g/eq, $m_{ICN}$ is a mass of the at least one isocyanate component in g, $EW_{ICN}$ is an equivalent weight of the at least one isocyanate component in g/eq, n is a number of cross linker or chain extender and the isocyanate, wherein the graphene nanoplatelets (C) have an oxygen content in a range of 0.01 wt.-% to 10 wt.-% based on a total weight of the graphene nano platelets (C).

13. The process according to claim 12, characterized in that the step (A') is substantially free of any solvent.

14. The process according to claim 12, characterized in that in step (A') the isocyanate prepolymer is obtained by:
- (A1') mixing the at least one polyol component (B) and the graphene nanoplatelets (C) to obtain an isocyanate reactive mixture,
- (A2') adding the isocyanate reactive mixture of step (A1') and the at least one isocyanate component (A) optionally in the presence of the at least one cross-linker or the chain extender (D) to obtain an isocyanate prepolymer having an NCO content in a range of 2 wt.-% to 50 wt.-%.

15. The process according to claim 12, characterized in that in step (A') the graphene nano platelets (C) are first mixed with the at least one isocyanate component (A) to obtain a mixture.

16. The process according to claim 12, characterized in that the graphene nano platelets (C) are present in the form of a powder or in the form of a dispersion.

17. A method of preparing a cast elastomer article, wherein the method comprises incorporating the cast elastomer according to claim 1 into the article.

18. An article comprising the cast elastomer according to claim 1.

19. A method of preparing a cast elastomer article, wherein the method comprises incorporating the cast elastomer obtained by the process according to claim 12 into the article.

20. An article comprising the cast elastomer obtained by the process according to claim 12.

* * * * *